US010402977B1

(12) United States Patent
Kim et al.

(10) Patent No.: US 10,402,977 B1
(45) Date of Patent: Sep. 3, 2019

(54) LEARNING METHOD AND LEARNING DEVICE FOR IMPROVING SEGMENTATION PERFORMANCE IN ROAD OBSTACLE DETECTION REQUIRED TO SATISFY LEVEL 4 AND LEVEL 5 OF AUTONOMOUS VEHICLES USING LAPLACIAN PYRAMID NETWORK AND TESTING METHOD AND TESTING DEVICE USING THE SAME

(71) Applicant: Stradvision, Inc., Pohang, Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Pohang-si (KR); SukHoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Pohang-si (KR); Hongmo Je, Pohang-si (KR); Hojin Cho, Gyeongsangbuk-do (KR)

(73) Assignee: Stradvision, Inc., Pohang, Gyeongbuk (KR)

( * ) Notice: Subject to any disclaimer, the term of this patent is extended or adjusted under 35 U.S.C. 154(b) by 0 days.

(21) Appl. No.: 16/257,713

(22) Filed: Jan. 25, 2019

(51) Int. Cl.
*G06T 7/11* (2017.01)
*G06K 9/62* (2006.01)
(Continued)

(52) U.S. Cl.
CPC .............. *G06T 7/11* (2017.01); *G06K 9/6215* (2013.01); *G06K 9/6232* (2013.01);
(Continued)

(58) Field of Classification Search
CPC .. G06K 9/6257; G06K 9/4642; G06K 9/6262; G06N 3/04; G06N 7/005
See application file for complete search history.

(56) References Cited

U.S. PATENT DOCUMENTS 10,157,441 B2 * 12/2018 Chang .................... G06K 9/628
10,223,610 B1 * 3/2019 Akselrod-Ballin .......... G06K 9/6218

(Continued)

OTHER PUBLICATIONS

He, Kaiming, et al. "Mask r-cnn." Proceedings of the IEEE international conference on computer vision. 2017. (Year: 2017).*

*Primary Examiner* — Utpal D Shah
(74) *Attorney, Agent, or Firm* — Kaplan Breyer Schwarz, LLP

(57) ABSTRACT

A learning method for improving a segmentation performance in detecting edges of road obstacles and traffic signs, etc. required to satisfy level 4 and level 5 of autonomous vehicles using a learning device is provided. The traffic signs, as well as landmarks and road markers may be detected more accurately by reinforcing text parts as edge parts in an image. The method includes steps of: the learning device (a) instructing k convolutional layers to generate k encoded feature maps, including h encoded feature maps corresponding to h mask layers; (b) instructing k deconvolutional layers to generate k decoded feature maps (i) by using h bandpass feature maps and h decoded feature maps corresponding to the h mask layers and (ii) by using feature maps to be inputted respectively to k-h deconvolutional layers; and (c) adjusting parameters of the deconvolutional and convolutional layers.

30 Claims, 5 Drawing Sheets

(51) Int. Cl.
*G06N 3/08* (2006.01)
*G06T 7/13* (2017.01)
*G06N 20/00* (2019.01)
*G06T 3/40* (2006.01)
*G06K 9/00* (2006.01)

(52) U.S. Cl.
CPC ......... *G06K 9/6257* (2013.01); *G06K 9/6262* (2013.01); *G06N 3/08* (2013.01); *G06N 20/00* (2019.01); *G06T 3/40* (2013.01); *G06T 7/13* (2017.01); *G06K 9/00805* (2013.01); *G06T 2207/20016* (2013.01); *G06T 2207/20081* (2013.01); *G06T 2207/20084* (2013.01)

(56) References Cited

U.S. PATENT DOCUMENTS

| | | | | |
|---|---|---|---|---|
| 10,304,193 | B1* | 5/2019 | Wang | G06T 7/11 |
| 2012/0134579 | A1* | 5/2012 | Kameyama | G06T 3/4053 382/159 |
| 2016/0358337 | A1* | 12/2016 | Dai | G06T 5/10 |
| 2017/0206434 | A1* | 7/2017 | Nariyambut Murali | G06K 9/628 |
| 2018/0108137 | A1* | 4/2018 | Price | G06T 7/11 |
| 2018/0116620 | A1* | 5/2018 | Chen | A61B 6/03 |
| 2018/0122114 | A1* | 5/2018 | Luan | G06T 7/194 |
| 2018/0211620 | A1* | 7/2018 | Kurokawa | G09G 3/3688 |
| 2018/0259608 | A1* | 9/2018 | Golden | G01R 33/5608 |
| 2018/0260793 | A1* | 9/2018 | Li | G06Q 10/20 |
| 2018/0285695 | A1* | 10/2018 | Guo | A61B 5/055 |
| 2018/0300564 | A1* | 10/2018 | Kwant | G06K 9/00818 |
| 2018/0300624 | A1* | 10/2018 | El-Khamy | G06N 3/08 |
| 2018/0307980 | A1* | 10/2018 | Barik | G06N 3/0445 |
| 2019/0026917 | A1* | 1/2019 | Liao | G06T 7/73 |
| 2019/0035101 | A1* | 1/2019 | Kwant | G06T 7/60 |
| 2019/0049540 | A1* | 2/2019 | Odry | G01R 33/543 |
| 2019/0050981 | A1* | 2/2019 | Song | G06T 7/0012 |
| 2019/0065817 | A1* | 2/2019 | Mesmakhosroshahi | G06K 9/0014 |
| 2019/0079999 | A1* | 3/2019 | Min | G06F 16/335 |
| 2019/0080456 | A1* | 3/2019 | Song | G06T 7/143 |
| 2019/0156144 | A1* | 5/2019 | Li | G06K 9/629 |

* cited by examiner

LEARNING METHOD AND LEARNING DEVICE FOR IMPROVING SEGMENTATION PERFORMANCE IN ROAD OBSTACLE DETECTION REQUIRED TO SATISFY LEVEL 4 AND LEVEL 5 OF AUTONOMOUS VEHICLES USING LAPLACIAN PYRAMID NETWORK AND TESTING METHOD AND TESTING DEVICE USING THE SAME

FIELD OF THE DISCLOSURE

The present disclosure relates to a learning method, a learning device, a testing method and a testing device for use with an autonomous vehicle; and more particularly, to the learning method and the learning device for improving a segmentation performance in road obstacle detection, and the testing method and the testing device using the same.

BACKGROUND OF THE DISCLOSURE

Deep learning is a technology used to cluster or classify objects or data. For example, computers cannot distinguish dogs and cats from photographs only. But a human can easily distinguish those two. To this end, a method called "machine learning" was devised. It is a technique to allow a computer to classify similar things among lots of data inputted thereto. When a photo of an animal similar to a dog is inputted, the computer will classify it as a dog photo.

There have already been many machine learning algorithms to classify data. For example, a decision tree, a Bayesian network, a support vector machine (SVM), an artificial neural network, etc. have been developed. The deep learning is a descendant of the artificial neural network.

Deep Convolution Neural Networks (Deep CNNs) are at the heart of the remarkable development in deep learning. CNNs have already been used in the 90's to solve the problems of character recognition, but their use has become as widespread as it is now thanks to recent research. These deep CNNs won the 2012 ImageNet image classification tournament, crushing other competitors. Then, the convolution neural network became a very useful tool in the field of the machine learning.

FIG. 1 is a drawing schematically illustrating a process of a general segmentation by using a CNN.

By referring to FIG. 1, according to a conventional lane detection method, a learning device receives an input image, instructs one or more multiple convolutional layers to generate at least one feature map by applying one or more multiple convolution operations and one or more non-linear operations, e.g., ReLU, to the input image, and then generates a segmentation result by instructing one or more deconvolutional layers to apply one or more deconvolution operations and SoftMax operations to the feature maps.

However, there is a problem that many of edges are missed in the process of encoding and decoding the input image so various methods have been provided to solve the problem and to reinforce the edges in the input image or its corresponding feature map. For example, Golnaz Ghiasi and Charless C. Fowlkes have suggested a method of the image segmentation using a Laplacian Pyramid by a paper called "Laplacian Pyramid Reconstruction and Refinement for Semantic Segmentation" (https://www.ics.uci.edu/~fowlkes/papers/gf-eccv16.pdf). This method was adopted to extract the edges from a small-sized feature map, and to add information on the edges to a large-sized feature map. However, it is difficult to achieve a significant improvement because most of the information on the edges is lost.

It is also difficult to say that this method actually uses the Laplacian Pyramid since it does not use the concept of separating a range of high frequencies into predetermined bands, unlike the title of the paper. Further, this method has a problem that it does not detect the edges accurately as it uses randomly generated edges rather than originally existing edges.

SUMMARY OF THE DISCLOSURE

It is an object of the present disclosure to solve all the aforementioned problems.

It is another object of the present disclosure to provide a method for generating at least one feature map with preserved information on edge parts by using a CNN.

It is still another object of the present disclosure to provide the CNN capable of establishing a Laplacian Pyramid network.

It is still yet another object of the present disclosure to provide a method for reflecting the information on the edge parts accurately by using original edge parts, not randomly generated edge parts.

In accordance with one aspect of the present disclosure, there is provided a learning method for improving a segmentation performance using a learning device, wherein the learning device includes (i) a first to a k-th convolutional layers, which respectively generate a first to a k-th encoded feature maps by applying one or more convolution operations to at least one feature map corresponding to at least one training image, (ii) a k-th to a first deconvolutional layers, which respectively generate a k-th to a first decoded feature maps by applying one or more deconvolution operations to the k-th encoded feature map, (iii) a first to an h-th mask layers respectively corresponding to h convolutional layers among the k convolutional layers, and (iv) a first to an h-th differential layers respectively corresponding to the first to the h-th mask layers, and wherein the h is an integer from 1 to (k−1), including steps of: (a) the learning device, if the training image is acquired, instructing the first to the k-th convolutional layers to generate the first to the k-th encoded feature maps through processes of (1) instructing the first to the h-th mask layers to extract one or more edge parts from h encoded feature maps, to be respectively inputted to the first to the h-th mask layers, among the first to the k-th encoded feature maps by acquiring one or more areas in which frequencies of the h encoded feature maps are larger than a predetermined threshold, to thereby generate a first to an h-th bandpass feature maps, and (2) instructing the first to the h-th differential layers to generate a first to an h-th differential feature maps by calculating each difference between each of the h encoded feature maps, to be respectively inputted to the first to the h-th mask layers, and each of the first to the h-th bandpass feature maps, to thereby forward each of the first to the h-th differential feature maps to their corresponding next convolutional layers; (b) the learning device instructing the k-th to the first deconvolutional layers to sequentially generate the k-th to the first decoded feature maps (i) by using the h-th to the first bandpass feature maps and h decoded feature maps each of which is outputted from each previous deconvolutional layer of each of h deconvolutional layers corresponding to the h-th to the first mask layers and (ii) by using feature maps outputted from each previous layer of each of k-h deconvolutional layers, which do not correspond to the h-th to the first mask layers; and (c) the learning device backpropagating one or more losses generated by referring to the first decoded feature map and its corresponding at least one GT (ground truth) label image, to thereby adjust one or more parameters of at least part of the first to the k-th deconvolutional layers and the k-th to the first convolutional layers.

As one example, at the process of (1), the learning device instructs at least m-th mask layer among the first to the h-th mask layers to extract areas, in which variations of frequencies are larger than the predetermined threshold, from an n-th encoded feature map transmitted from an n-th convolutional layer corresponding to the m-th mask layer, to thereby generate an m-th bandpass feature map, wherein the m is an integer from 1 to the h, and wherein the n is an integer from 1 to the k, at the process of (2), the learning device instructs an m-th differential layer corresponding to the m-th mask layer to generate an m-th differential feature map by calculating a difference between the n-th encoded feature map and the m-th bandpass feature map and to forward the m-th differential feature map to an (n+1)-th convolutional layer following the n-th convolutional layer, and, at the step of (b), the learning device instructs an n-th deconvolutional layer corresponding to the m-th mask layer to apply the deconvolution operations to an element-wise sum of the m-th bandpass feature map and an (n+1)-th decoded feature map outputted from an (n+1)-th deconvolutional layer, to thereby generate an n-th decoded feature map.

As one example, at the step of (c), the learning device instructs at least one loss layer corresponding to at least one of the k-th to the first deconvolutional layers to generate the losses by referring to at least one decoded feature map, outputted from said at least one of the k-th to the first deconvolutional layers, and its corresponding at least one GT label image, to thereby backpropagate the losses.

As one example, at the step of (a), the learning device instructs the first to the k-th convolutional layers to respectively generate the first to the k-th encoded feature maps by sequentially decreasing sizes of the training image and the first to the (k−1)-th encoded feature maps and increasing the number of channels of the training image and the first to the (k−1)-th encoded feature maps, and instructs the first to the h-th mask layers to extract the edge parts from the h encoded feature maps, to be respectively inputted to the first to the h-th mask layers, among the first to the k-th encoded feature maps by extracting the areas where variations of the frequencies of the h encoded feature maps are larger than the predetermined threshold, to thereby generate the first to the h-th bandpass feature maps, and, at the step of (b), the learning device instructs the k-th to the first deconvolutional layers to respectively generate the k-th to the first decoded feature maps by sequentially increasing sizes of the k-th encoded feature map and the k-th to the second decoded feature maps and decreasing the number of channels of the k-th encoded feature map and the k-th to the second decoded feature maps.

As one example, the learning device further includes (v) a first to an h-th intermediate layers each of which is located between each of the first to the h-th mask layers and its corresponding deconvolutional layer; wherein the step of (b) includes steps of: (b1) the learning device instructing the first to the h-th intermediate layers to respectively generate a first to an h-th intermediate feature maps by acquiring each of the first to the h-th bandpass feature maps, outputted from the first to the h-th mask layers; and (b2) the learning device instructing the k deconvolutional layers to sequentially generate the k-th to the first decoded feature maps (i) by using the h-th to the first intermediate feature maps and the h decoded feature maps each of which is outputted from each previous deconvolutional layer of each of the h deconvolutional layers corresponding to the h-th to the first intermediate layers and (ii) by using the k-th encoded feature map and k-h-1 decoded feature maps outputted from each previous layer of each of the k-h deconvolutional layers, which do not correspond to the h-th to the first intermediate layers.

As one example, the learning device further includes an additional (h+1)-th intermediate layer between the k-th convolutional layer and the k-th deconvolutional layer, wherein the additional (h+1)-th intermediate layer generates an (h+1)-th intermediate feature map by applying intermediate operations to the k-th encoded feature maps and forwards the (h+1)-th intermediate feature map to the k-th deconvolutional layer.

As one example, at least one of the first to the h-th intermediate layers performs one or more dilated convolution operations, wherein at least one receptive field of the h intermediate layers is determined according to filter weights having a value of 0.

As one example, at the process of (1), the learning device instructs at least m-th mask layer among the first to the h-th mask layers to extract areas, in which variations of the frequencies are larger than the predetermined threshold, from an n-th encoded feature map transmitted from an n-th convolutional layer corresponding to the m-th mask layer, to thereby generate an m-th bandpass feature map, wherein the m is an integer from 1 to the h, and wherein the n is an integer from 1 to the k, at the process of (2), the learning device instructs an m-th differential layer corresponding to the m-th mask layer to generate an m-th differential feature map by calculating a difference between the n-th encoded feature map and the m-th bandpass feature map and to forward the m-th differential feature map to an (n+1)-th convolutional layer following the n-th convolutional layer, at the step of (b1), the learning device instructs an m-th intermediate layer corresponding to the m-th mask layer to generate an m-th intermediate feature map by referring to the m-th bandpass feature map, and, at the step of (b2), the learning device instructs an n-th deconvolutional layer corresponding to the m-th intermediate layer to apply the deconvolution operations to an element-wise sum of the m-th intermediate feature map and an (n+1)-th decoded feature map outputted from an (n+1)-th deconvolutional layer, to thereby generate an n-th decoded feature map.

In accordance with another aspect of the present disclosure, there is provided a testing method for a segmentation of at least one test image, including steps of: (a) on condition that, assuming that a learning device includes (i) a first to a k-th convolutional layers, which respectively generate a first to a k-th encoded feature maps for training by applying one or more convolution operations to at least one feature map for training corresponding to at least one training image, (ii) a k-th to a first deconvolutional layers, which respectively generate a k-th to a first decoded feature maps for training by applying one or more deconvolution operations to the k-th encoded feature map for training, (iii) a first to an h-th mask layers respectively corresponding to h convolutional layers among the k convolutional layers, and (iv) a first to an h-th differential layers respectively corresponding to the first to the h-th mask layers, wherein the h is an integer from 1 to (k−1), the learning device (1) has instructed the first to the k-th convolutional layers to generate the first to the k-th encoded feature maps for training through processes of (1-1) instructing the first to the h-th mask layers to extract one or more edge parts for training from h encoded feature maps for training, to be respectively inputted to the first to the h-th mask layers, among the first to the k-th encoded feature maps for training by acquiring one or more areas for training in which frequencies of the h encoded feature maps for training are larger than a predetermined threshold, to thereby generate a first to an h-th bandpass feature maps for training, and (1-2) instructing the first to the h-th differential layers to generate a first to an h-th differential feature maps for training by calculating each difference between each of the h encoded feature maps for training, to be respectively inputted to the first to the h-th mask layers, and each of the first to the h-th bandpass feature maps for training, to thereby forward each of the first to the h-th differential feature maps for training to their corresponding next convolutional layers, (2) has instructed the k-th to the first deconvolutional layers to sequentially generate the k-th to the first decoded feature maps for training (2-1) by using the h-th to the first bandpass feature maps for training and h decoded feature maps for training each of which is outputted from each previous deconvolutional layer of each of h deconvolutional layers corresponding to the h-th to the first mask layers and (2-2) by using feature maps for training outputted from each previous layer of each of k-h deconvolutional layers, which do not correspond to the h-th to the first mask layers, and (3) has backpropagated one or more losses generated by referring to the first decoded feature map for training and its corresponding at least one GT (ground truth) label image, to thereby adjust one or more parameters of at least part of the first to the k-th deconvolutional layers and the k-th to the first convolutional layers; a testing device, if the test image is acquired, instructing the first to the k-th convolutional layers to generate a first to a k-th encoded feature maps for testing through processes of (a1) instructing the first to the h-th mask layers to extract one or more edge parts for testing from h encoded feature maps for testing, to be respectively inputted to the first to the h-th mask layers, among the first to the k-th encoded feature maps for testing by acquiring one or more areas for testing in which frequencies of the h encoded feature maps for testing are larger than a predetermined threshold, to thereby generate a first to an h-th bandpass feature maps for testing, and (a2) instructing the first to the h-th differential layers to generate a first to an h-th differential feature maps for testing by calculating each difference between each of the h encoded feature maps for testing, to be respectively inputted to the first to the h-th mask layers, and each of the first to the h-th bandpass feature maps for testing, to thereby forward each of the first to the h-th differential feature maps for testing to their corresponding next convolutional layers; and (b) the testing device instructing the k-th to the first deconvolutional layers to sequentially generate the k-th to the first decoded feature maps for testing (i) by using the h-th to the first bandpass feature maps for testing and h decoded feature maps for testing each of which is outputted from each previous deconvolutional layer of each of h deconvolutional layers corresponding to the h-th to the first mask layers and (ii) by using feature maps for testing outputted from each previous layer of each of k-h deconvolutional layers, which do not correspond to the h-th to the first mask layers.

As one example, at the process of (a1), the testing device instructs at least m-th mask layer among the first to the h-th mask layers to extract areas, in which variations of frequencies are larger than the predetermined threshold, from an n-th encoded feature map for testing transmitted from an n-th convolutional layer corresponding to the m-th mask layer, to thereby generate an m-th bandpass feature map for testing, wherein the m is an integer from 1 to the h, and wherein the n is an integer from 1 to the k, at the process of (a2), the testing device instructs an m-th differential layer corresponding to the m-th mask layer to generate an m-th differential feature map for testing by calculating a difference between the n-th encoded feature map for testing and the m-th bandpass feature map for testing and to forward the m-th differential feature map for testing to an (n+1)-th convolutional layer following the n-th convolutional layer, and, at the step of (b), the testing device instructs an n-th deconvolutional layer corresponding to the m-th mask layer to apply the deconvolution operations to an element-wise sum for testing of the m-th bandpass feature map for testing and an (n+1)-th decoded feature map for testing outputted from an (n+1)-th deconvolutional layer, to thereby generate an n-th decoded feature map for testing.

As one example, at the step of (a), the testing device instructs the first to the k-th convolutional layers to respectively generate the first to the k-th encoded feature maps for testing by sequentially decreasing sizes of the test image and the first to the (k−1)-th encoded feature maps for testing and increasing the number of channels of the test image and the first to the (k−1)-th encoded feature maps for testing, and instructs the first to the h-th mask layers to extract the edge parts for testing from the h encoded feature maps for testing, to be respectively inputted to the first to the h-th mask layers, among the first to the k-th encoded feature maps for testing by extracting the areas where variations of the frequencies of the h encoded feature maps for testing are larger than the predetermined threshold, to thereby generate the first to the h-th bandpass feature maps for testing, and, at the step of (b), the testing device instructs the k-th to the first deconvolutional layers to respectively generate the k-th to the first decoded feature maps for testing by sequentially increasing sizes of the k-th encoded feature map for testing and the k-th to the second decoded feature maps for testing and decreasing the number of channels of the k-th encoded feature map for testing and the k-th to the second decoded feature maps for testing.

As one example, the testing device further includes (v) a first to an h-th intermediate layers each of which is located between each of the first to the h-th mask layers and its corresponding deconvolutional layer; wherein the step of (b) includes steps of: (b1) the testing device instructing the first to the h-th intermediate layers to respectively generate a first to an h-th intermediate feature maps for testing by acquiring each of the first to the h-th bandpass feature maps for testing, outputted from the first to the h-th mask layers; and (b2) the testing device instructing the k deconvolutional layers to sequentially generate the k-th to the first decoded feature maps for testing (i) by using the h-th to the first intermediate feature maps for testing and the h decoded feature maps for testing each of which is outputted from each previous deconvolutional layer of each of the h deconvolutional layers corresponding to the h-th to the first intermediate layers and (ii) by using the k-th encoded feature map for testing and k-h-1 decoded feature maps for testing outputted from each previous layer of each of the k-h deconvolutional layers, which do not correspond to the h-th to the first intermediate layers.

As one example, the testing device further includes an additional (h+1)-th intermediate layer between the k-th convolutional layer and the k-th deconvolutional layer, wherein the additional (h+1)-th intermediate layer generates an (h+1)-th intermediate feature map for testing by applying intermediate operations to the k-th encoded feature maps for testing and forwards the (h+1)-th intermediate feature map for testing to the k-th deconvolutional layer.

As one example, at least one of the first to the h-th intermediate layers performs one or more dilated convolution operations, wherein at least one receptive field of the h intermediate layers is determined according to filter weights having a value of 0.

As one example, at the process of (a1), the testing device instructs at least m-th mask layer among the first to the h-th mask layers to extract areas, in which variations of the frequencies are larger than the predetermined threshold, from an n-th encoded feature map for testing transmitted from an n-th convolutional layer corresponding to the m-th mask layer, to thereby generate an m-th bandpass feature map for testing, wherein the m is an integer from 1 to the h, and wherein the n is an integer from 1 to the k, at the process of (a2), the testing device instructs an m-th differential layer corresponding to the m-th mask layer to generate an m-th differential feature map for testing by calculating a difference between the n-th encoded feature map for testing and the m-th bandpass feature map for testing and to forward the m-th differential feature map for testing to an (n+1)-th convolutional layer following the n-th convolutional layer, at the step of (b1), the testing device instructs an m-th intermediate layer corresponding to the m-th mask layer to generate an m-th intermediate feature map for testing by referring to the m-th bandpass feature map for testing, and, at the step of (b2), the testing device instructs an n-th deconvolutional layer corresponding to the m-th intermediate layer to apply the deconvolution operations to an element-wise sum for testing of the m-th intermediate feature map for testing and an (n+1)-th decoded feature map for testing outputted from an (n+1)-th deconvolutional layer, to thereby generate an n-th decoded feature map for testing.

In accordance with still another aspect of the present disclosure, there is provided a learning device for improving a segmentation performance in which (i) a first to a k-th convolutional layers, which respectively generate a first to a k-th encoded feature maps by applying one or more convolution operations to at least one feature map corresponding to at least one training image, (ii) a k-th to a first deconvolutional layers, which respectively generate a k-th to a first decoded feature maps by applying one or more deconvolution operations to the k-th encoded feature map, (iii) a first to an h-th mask layers respectively corresponding to h convolutional layers among the k convolutional layers, and (iv) a first to an h-th differential layers respectively corresponding to the first to the h-th mask layers, wherein the h is an integer from 1 to (k−1) are included, including: at least one memory that stores instructions; and at least one processor configured to execute the instructions to: perform processes of (I) instructing the first to the k-th convolutional layers to generate the first to the k-th encoded feature maps through processes of (I-1) instructing the first to the h-th mask layers to extract one or more edge parts from h encoded feature maps, to be respectively inputted to the first to the h-th mask layers, among the first to the k-th encoded feature maps by acquiring one or more areas in which frequencies of the h encoded feature maps are larger than a predetermined threshold, to thereby generate a first to an h-th bandpass feature maps, and (I-2) instructing the first to the h-th differential layers to generate a first to an h-th differential feature maps by calculating each difference between each of the h encoded feature maps, to be respectively inputted to the first to the h-th mask layers, and each of the first to the h-th bandpass feature maps, to thereby forward each of the first to the h-th differential feature maps to their corresponding next convolutional layers, (II) instructing the k-th to the first deconvolutional layers to sequentially generate the k-th to the first decoded feature maps (i) by using the h-th to the first bandpass feature maps and h decoded feature maps each of which is outputted from each previous deconvolutional layer of each of h deconvolutional layers corresponding to the h-th to the first mask layers and (ii) by using feature maps outputted from each previous layer of each of k-h deconvolutional layers, which do not correspond to the h-th to the first mask layers, and (III) backpropagating one or more losses generated by referring to the first decoded feature map and its corresponding at least one GT (ground truth) label image, to thereby adjust one or more parameters of at least part of the first to the k-th deconvolutional layers and the k-th to the first convolutional layers.

As one example, at the process of (I-1), the processor instructs at least m-th mask layer among the first to the h-th mask layers to extract areas, in which variations of frequencies are larger than the predetermined threshold, from an n-th encoded feature map transmitted from an n-th convolutional layer corresponding to the m-th mask layer, to thereby generate an m-th bandpass feature map, wherein the m is an integer from 1 to the h, and wherein the n is an integer from 1 to the k, at the process of (I-2), the processor instructs an m-th differential layer corresponding to the m-th mask layer to generate an m-th differential feature map by calculating a difference between the n-th encoded feature map and the m-th bandpass feature map and to forward the m-th differential feature map to an (n+1)-th convolutional layer following the n-th convolutional layer, and, at the process of (II), the processor instructs an n-th deconvolutional layer corresponding to the m-th mask layer to apply the deconvolution operations to an element-wise sum of the m-th bandpass feature map and an (n+1)-th decoded feature map outputted from an (n+1)-th deconvolutional layer, to thereby generate an n-th decoded feature map.

As one example, at the process of (III), the processor instructs at least one loss layer corresponding to at least one of the k-th to the first deconvolutional layers to generate the losses by referring to at least one decoded feature map, outputted from said at least one of the k-th to the first deconvolutional layers, and its corresponding at least one GT label image, to thereby backpropagate the losses.

As one example, at the process of (I), the processor instructs the first to the k-th convolutional layers to respectively generate the first to the k-th encoded feature maps by sequentially decreasing sizes of the training image and the first to the (k−1)-th encoded feature maps and increasing the number of channels of the training image and the first to the (k−1)-th encoded feature maps, and instructs the first to the h-th mask layers to extract the edge parts from the h encoded feature maps, to be respectively inputted to the first to the h-th mask layers, among the first to the k-th encoded feature maps by extracting the areas where variations of the frequencies of the h encoded feature maps are larger than the predetermined threshold, to thereby generate the first to the h-th bandpass feature maps, and, at the process of (II), the processor instructs the k-th to the first deconvolutional layers to respectively generate the k-th to the first decoded feature maps by sequentially increasing sizes of the k-th encoded feature map and the k-th to the second decoded feature maps and decreasing the number of channels of the k-th encoded feature map and the k-th to the second decoded feature maps.

As one example, (v) a first to an h-th intermediate layers each of which is located between each of the first to the h-th mask layers and its corresponding deconvolutional layer are further included in the learning device; wherein the process of (II) includes processes of: (II-1) the processor instructing the first to the h-th intermediate layers to respectively generate a first to an h-th intermediate feature maps by acquiring each of the first to the h-th bandpass feature maps, outputted from the first to the h-th mask layers; and (II-2) the processor instructing the k deconvolutional layers to sequentially generate the k-th to the first decoded feature maps (i) by using the h-th to the first intermediate feature maps and the h decoded feature maps each of which is outputted from each previous deconvolutional layer of each of the h deconvolutional layers corresponding to the h-th to the first intermediate layers and (ii) by using the k-th encoded feature map and k-h-1 decoded feature maps outputted from each previous layer of each of the k-h deconvolutional layers, which do not correspond to the h-th to the first intermediate layers.

As one example, an additional (h+1)-th intermediate layer between the k-th convolutional layer and the k-th deconvolutional layer, wherein the additional (h+1)-th intermediate layer generates an (h+1)-th intermediate feature map by applying intermediate operations to the k-th encoded feature maps and forwards the (h+1)-th intermediate feature map to the k-th deconvolutional layer are further included in the learning device.

As one example, at least one of the first to the h-th intermediate layers performs one or more dilated convolution operations, wherein at least one receptive field of the h intermediate layers is determined according to filter weights having a value of 0.

As one example, at the process of (I-1), the processor instructs at least m-th mask layer among the first to the h-th mask layers to extract areas, in which variations of the frequencies are larger than the predetermined threshold, from an n-th encoded feature map transmitted from an n-th convolutional layer corresponding to the m-th mask layer, to thereby generate an m-th bandpass feature map, wherein the m is an integer from 1 to the h, and wherein the n is an integer from 1 to the k, at the process of (I-2), the processor instructs an m-th differential layer corresponding to the m-th mask layer to generate an m-th differential feature map by calculating a difference between the n-th encoded feature map and the m-th bandpass feature map and to forward the m-th differential feature map to an (n+1)-th convolutional layer following the n-th convolutional layer, at the process of (II-1), the processor instructs an m-th intermediate layer corresponding to the m-th mask layer to generate an m-th intermediate feature map by referring to the m-th bandpass feature map, and, at the process of (II-2), the processor instructs an n-th deconvolutional layer corresponding to the m-th intermediate layer to apply the deconvolution operations to an element-wise sum of the m-th intermediate feature map and an (n+1)-th decoded feature map outputted from an (n+1)-th deconvolutional layer, to thereby generate an n-th decoded feature map.

In accordance with still yet another aspect of the present disclosure, there is provided a testing device for a segmentation of at least one test image, including: at least one memory that stores instructions; and at least one processor, on condition that, assuming that a learning device includes (i) a first to a k-th convolutional layers, which respectively generate a first to a k-th encoded feature maps for training by applying one or more convolution operations to at least one feature map for training corresponding to at least one training image, (ii) a k-th to a first deconvolutional layers, which respectively generate a k-th to a first decoded feature maps for training by applying one or more deconvolution operations to the k-th encoded feature map for training, (iii) a first to an h-th mask layers respectively corresponding to h convolutional layers among the k convolutional layers, and (iv) a first to an h-th differential layers respectively corresponding to the first to the h-th mask layers, wherein the h is an integer from 1 to (k−1), the learning device (1) has instructed the first to the k-th convolutional layers to generate the first to the k-th encoded feature maps for training through processes of (1-1) instructing the first to the h-th mask layers to extract one or more edge parts for training from h encoded feature maps for training, to be respectively inputted to the first to the h-th mask layers, among the first to the k-th encoded feature maps for training by acquiring one or more areas for training in which frequencies of the h encoded feature maps for training are larger than a predetermined threshold, to thereby generate a first to an h-th bandpass feature maps for training, and (1-2) instructing the first to the h-th differential layers to generate a first to an h-th differential feature maps for training by calculating each difference between each of the h encoded feature maps for training, to be respectively inputted to the first to the h-th mask layers, and each of the first to the h-th bandpass feature maps for training, to thereby forward each of the first to the h-th differential feature maps for training to their corresponding next convolutional layers, (2) has instructed the k-th to the first deconvolutional layers to sequentially generate the k-th to the first decoded feature maps for training (2-1) by using the h-th to the first bandpass feature maps for training and h decoded feature maps for training each of which is outputted from each previous deconvolutional layer of each of h deconvolutional layers corresponding to the h-th to the first mask layers and (2-2) by using feature maps for training outputted from each previous layer of each of k-h deconvolutional layers, which do not correspond to the h-th to the first mask layers, and (3) has backpropagated one or more losses generated by referring to the first decoded feature map for training and its corresponding at least one GT (ground truth) label image, to thereby adjust one or more parameters of at least part of the first to the k-th deconvolutional layers and the k-th to the first convolutional layers; configured to execute the instructions to: perform processes of (I) instructing the first to the k-th convolutional layers to generate a first to a k-th encoded feature maps for testing through processes of (I-1) instructing the first to the h-th mask layers to extract one or more edge parts for testing from h encoded feature maps for testing, to be respectively inputted to the first to the h-th mask layers, among the first to the k-th encoded feature maps for testing by acquiring one or more areas for testing in which frequencies of the h encoded feature maps for testing are larger than a predetermined threshold, to thereby generate a first to an h-th bandpass feature maps for testing, and (I-2) instructing the first to the h-th differential layers to generate a first to an h-th differential feature maps for testing by calculating each difference between each of the h encoded feature maps for testing, to be respectively inputted to the first to the h-th mask layers, and each of the first to the h-th bandpass feature maps for testing, to thereby forward each of the first to the h-th differential feature maps for testing to their corresponding next convolutional layers, and (II) instructing the k-th to the first deconvolutional layers to sequentially generate the k-th to the first decoded feature maps for testing (i) by using the h-th to the first bandpass feature maps for testing and h decoded feature maps for testing each of which is outputted from each previous deconvolutional layer of each of h deconvolutional layers corresponding to the h-th to the first mask layers and (ii) by using feature maps for testing outputted from each previous layer of each of k-h deconvolutional layers, which do not correspond to the h-th to the first mask layers.

As one example, at the process of (I-1), the processor instructs at least m-th mask layer among the first to the h-th mask layers to extract areas, in which variations of frequencies are larger than the predetermined threshold, from an n-th encoded feature map for testing transmitted from an n-th convolutional layer corresponding to the m-th mask layer, to thereby generate an m-th bandpass feature map for testing, wherein the m is an integer from 1 to the h, and wherein the n is an integer from 1 to the k, at the process of (I-2), the processor instructs an m-th differential layer corresponding to the m-th mask layer to generate an m-th differential feature map for testing by calculating a difference between the n-th encoded feature map for testing and the m-th bandpass feature map for testing and to forward the m-th differential feature map for testing to an (n+1)-th convolutional layer following the n-th convolutional layer, and, at the process of (II), the processor instructs an n-th deconvolutional layer corresponding to the m-th mask layer to apply the deconvolution operations to an element-wise sum for testing of the m-th bandpass feature map for testing and an (n+1)-th decoded feature map for testing outputted from an (n+1)-th deconvolutional layer, to thereby generate an n-th decoded feature map for testing.

As one example, at the process of (I), the processor instructs the first to the k-th convolutional layers to respectively generate the first to the k-th encoded feature maps for testing by sequentially decreasing sizes of the test image and the first to the (k−1)-th encoded feature maps for testing and increasing the number of channels of the test image and the first to the (k−1)-th encoded feature maps for testing, and instructs the first to the h-th mask layers to extract the edge parts for testing from the h encoded feature maps for testing, to be respectively inputted to the first to the h-th mask layers, among the first to the k-th encoded feature maps for testing by extracting the areas where variations of the frequencies of the h encoded feature maps for testing are larger than the predetermined threshold, to thereby generate the first to the h-th bandpass feature maps for testing, and, at the process of (II), the processor instructs the k-th to the first deconvolutional layers to respectively generate the k-th to the first decoded feature maps for testing by sequentially increasing sizes of the k-th encoded feature map for testing and the k-th to the second decoded feature maps for testing and decreasing the number of channels of the k-th encoded feature map for testing and the k-th to the second decoded feature maps for testing.

As one example, (v) a first to an h-th intermediate layers each of which is located between each of the first to the h-th mask layers and its corresponding deconvolutional layer are further included in the testing device; wherein the process of (II) includes processes of: (II-1) the processor instructing the first to the h-th intermediate layers to respectively generate a first to an h-th intermediate feature maps for testing by acquiring each of the first to the h-th bandpass feature maps for testing, outputted from the first to the h-th mask layers; and (II-2) the processor instructing the k deconvolutional layers to sequentially generate the k-th to the first decoded feature maps for testing (i) by using the h-th to the first intermediate feature maps for testing and the h decoded feature maps for testing each of which is outputted from each previous deconvolutional layer of each of the h deconvolutional layers corresponding to the h-th to the first intermediate layers and (ii) by using the k-th encoded feature map for testing and k-h-1 decoded feature maps for testing outputted from each previous layer of each of the k-h deconvolutional layers, which do not correspond to the h-th to the first intermediate layers.

As one example, an additional (h+1)-th intermediate layer between the k-th convolutional layer and the k-th deconvolutional layer, wherein the additional (h+1)-th intermediate layer generates an (h+1)-th intermediate feature map for testing by applying intermediate operations to the k-th encoded feature maps for testing and forwards the (h+1)-th intermediate feature map for testing to the k-th deconvolutional layer are further included in the testing device.

As one example, at least one of the first to the h-th intermediate layers performs one or more dilated convolution operations, wherein at least one receptive field of the h intermediate layers is determined according to filter weights having a value of 0.

As one example, at the process of (I-1), the processor instructs at least m-th mask layer among the first to the h-th mask layers to extract areas, in which variations of the frequencies are larger than the predetermined threshold, from an n-th encoded feature map for testing transmitted from an n-th convolutional layer corresponding to the m-th mask layer, to thereby generate an m-th bandpass feature map for testing, wherein the m is an integer from 1 to the h, and wherein the n is an integer from 1 to the k, at the process of (I-2), the processor instructs an m-th differential layer corresponding to the m-th mask layer to generate an m-th differential feature map for testing by calculating a difference between the n-th encoded feature map for testing and the m-th bandpass feature map for testing and to forward the m-th differential feature map for testing to an (n+1)-th convolutional layer following the n-th convolutional layer, at the process of (II-1), the processor instructs an m-th intermediate layer corresponding to the m-th mask layer to generate an m-th intermediate feature map for testing by referring to the m-th bandpass feature map for testing, and, at the process of (II-2), the processor instructs an n-th deconvolutional layer corresponding to the m-th intermediate layer to apply the deconvolution operations to an element-wise sum for testing of the m-th intermediate feature map for testing and an (n+1)-th decoded feature map for testing outputted from an (n+1)-th deconvolutional layer, to thereby generate an n-th decoded feature map for testing.

BRIEF DESCRIPTION OF THE DRAWINGS

The above and other objects and features of the present disclosure will become apparent from the following description of preferred embodiments given in conjunction with the accompanying drawings.

DETAILED DESCRIPTION OF THE PREFERRED EMBODIMENTS

Figure 1:
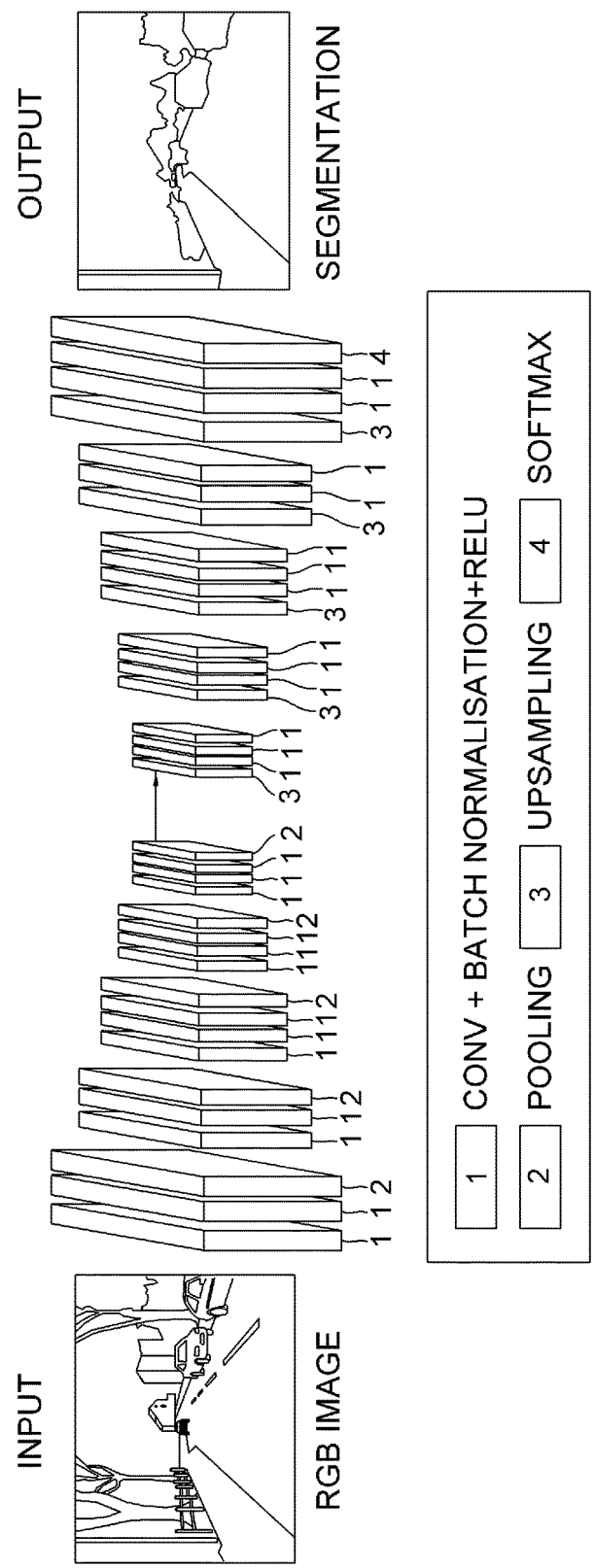
FIG. 1 is a drawing schematically illustrating a process of a convolutional segmentation by using a CNN.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached drawings will be explained in detail as shown below.

Figure 2:
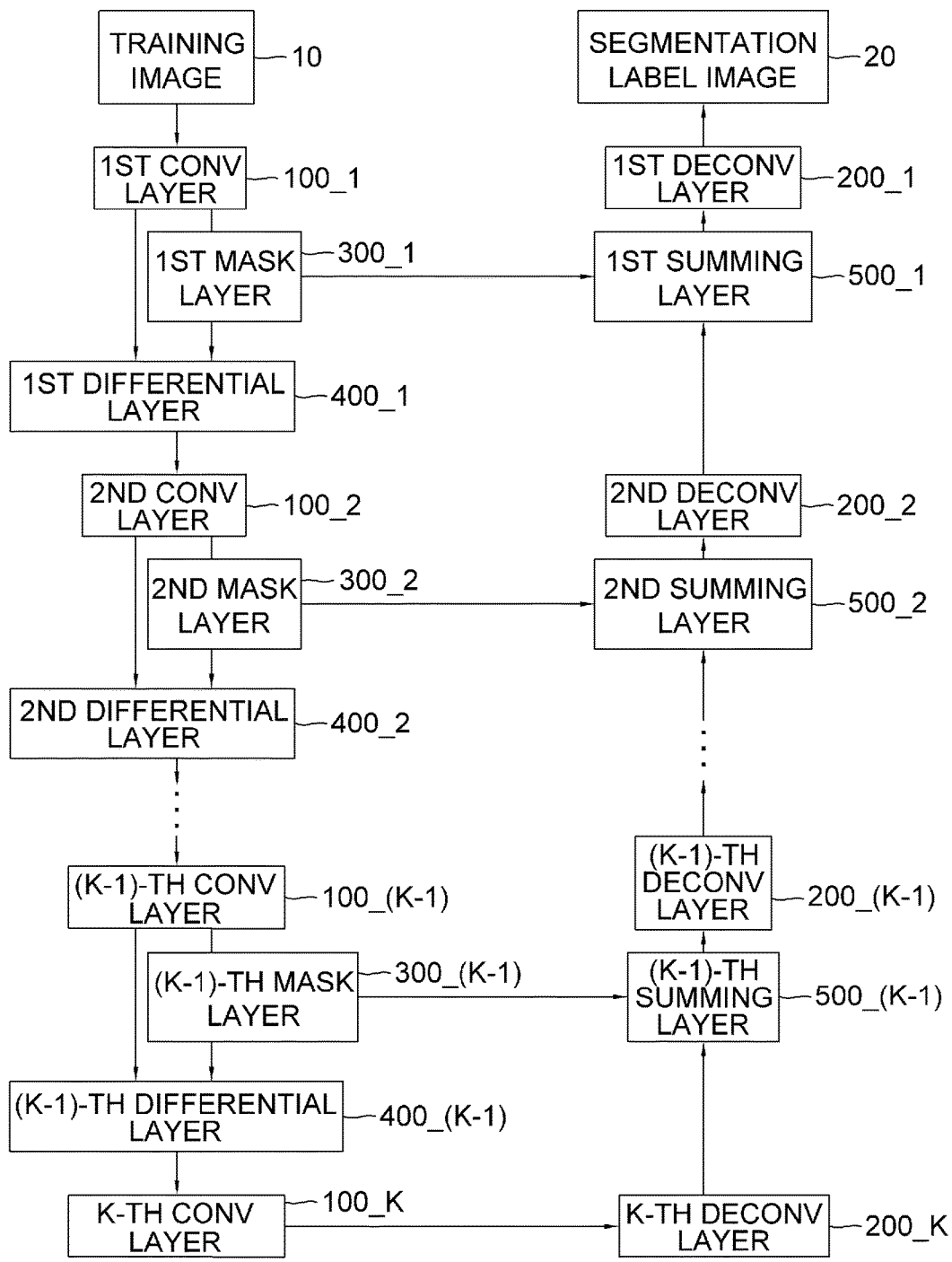
FIG. 2 is a drawing schematically illustrating a process of an image segmentation by using a Laplacian Pyramid network in accordance with one example embodiment of the present disclosure.

FIG. 2 is a drawing schematically illustrating a process of an image segmentation by using a Laplacian Pyramid network in accordance with one example embodiment of the present disclosure.

A learning device based on a CNN for learning the Laplacian Pyramid network in accordance with the present disclosure may include a first to a k-th convolutional layers 100_1 to 100_$k$ and a k-th to a first deconvolutional layers 200_$k$ to 200_1 which are connected sequentially, as illustrated in FIG. 2. Also, a first to a (k−1)-th mask layers 300_1 to 300_(k−1) and a first to a (k−1)-th differential layers 400_1 to 400_(k−1) may be included after each of the first to the (k−1)-th convolutional layers 100_1 to 100_(k−1). Herein, each of the first to the (k−1)-th differential layers 400_1 to 400_(k−1) may be connected with its corresponding next convolutional layer to forward each difference between each of feature maps outputted from the first to the (k−1)-th convolutional layers 100_1 to 100_(k−1) and each of feature maps outputted from the first to the (k−1)-th mask layers 300_1 to 300_(k−1) to said corresponding next convolutional layer. Meanwhile, after each of the k-th to the second deconvolutional layers 200_$k$ to 200_2, there are a (k−1)-th to a first summing layers 500_(k−1) to 500_1 for summing each of outputs from the (k−1)-th to the first mask layers 300_(k−1) to 300_1 and each of outputs from the k-th to the second deconvolutional layers 200_$k$ to 200_2. Herein, a term "differential" may not mean differentiation or differential calculus in mathematics.

First of all, if at least one training image 10 is inputted, the first to the k-th convolutional layers 100_1 to 100_$k$ may generate a first to a k-th encoded feature maps, and then the k-th to the first deconvolutional layers 200_$k$ to 200_1 may generate a k-th to a first decoded feature maps by applying one or more deconvolution operations to the k-th encoded feature map. Additionally, at least one segmentation label image 20 may be generated by applying at least one certain operation to the first decoded feature map.

By referring to FIG. 2, in the process of generating the first to the k-th encoded feature maps, the learning device (i) may instruct the first to the (k−1)-th mask layers 300_1 to 300_(k−1) to extract one or more edge parts from the first to the (k−1)th encoded feature maps, outputted from the first to the (k−1)-th convolutional layers, by acquiring one or more areas in which frequencies of the first to the (k−1)-th encoded feature maps are larger than a predetermined threshold, to thereby generate a first to a (k−1)-th bandpass feature map respectively, and (ii) may instruct the first to the (k−1)-th differential layers 400_1 to 400_(k−1) to respectively generate a first to a (k−1)-th differential feature maps by calculating each difference between each of the first to the (k−1)-th encoded feature maps outputted from the first to the (k−1)-th convolutional layers 100_1 to 100_(k−1) and each of the first to the (k−1)-th bandpass feature maps outputted from the first to the (k−1)-th mask layers, to thereby forward each of the first to the (k−1)-th differential feature maps to their corresponding next convolutional layers.

Also, in the process of generating the k-th to the first decoded feature maps, if the k-th encoded feature map is inputted to the k-th deconvolutional layer 200_$k$, the k-th to the first deconvolutional layers 200_$k$ to 200_1 may sequentially generate the k-th to the first decoded feature maps by applying the deconvolution operations respectively to the k-th encoded feature map and the k-th to the second decoded feature map outputted from their previous deconvolutional layers, wherein the (k−1)-th to the first bandpass feature maps outputted from the (k−1)-th to the first mask layers 300_(k−1) to 300_1 may be reflected on the k-th to the second decoded feature maps.

Herein, the learning device (i) may instruct the first to the k-th convolutional layers 100_1 to 100_$k$ to respectively generate the first to the k-th encoded feature maps by sequentially decreasing sizes of the training image and the first to the (k−1)-th encoded feature maps and increasing the number of channels of the training image and the first to the (k−1)-th encoded feature maps, (ii) may instruct the first to the (k−1)-th mask layers 300_1 to 300_(k−1) to extract the edge parts from the first to the (k−1)-th encoded feature maps by extracting the areas where variations of the frequencies of the first to the (k−1)-th encoded feature maps are larger than the predetermined threshold, to thereby generate the first to the (k−1)-th bandpass feature maps, and (iii) may instruct the k-th to the first deconvolutional layers 200_k to 200_1 to respectively generate the k-th to the first decoded feature maps by sequentially increasing sizes of the k-th encoded feature map and the k-th to the second decoded feature maps and decreasing the number of channels of the k-th encoded feature map and the k-th to the second decoded feature maps.

Further, the learning device may backpropagate one or more losses generated by referring to the segmentation label image 20 and its corresponding at least one GT (ground truth) label image, to thereby adjust one or more parameters of at least part of the first to the k-th deconvolutional layers and the k-th to the first convolutional layers.

Meanwhile, the learning device may instruct at least one loss layer to generate the losses by not only using outputs from the first deconvolutional layers 200_1 but also using a plurality of the decoded feature maps outputted from a plurality of the deconvolutional layers. For example, the learning device may instruct the loss layer (not illustrated) corresponding to at least one of the k-th to the first deconvolutional layers 200_k to 200_1 to generate one or more losses by referring to at least one decoded feature map, outputted from said at least one of the k-th to the first deconvolutional layers, and its corresponding GT label image. Then, the learning device may backpropagate the losses.

Figure 3:
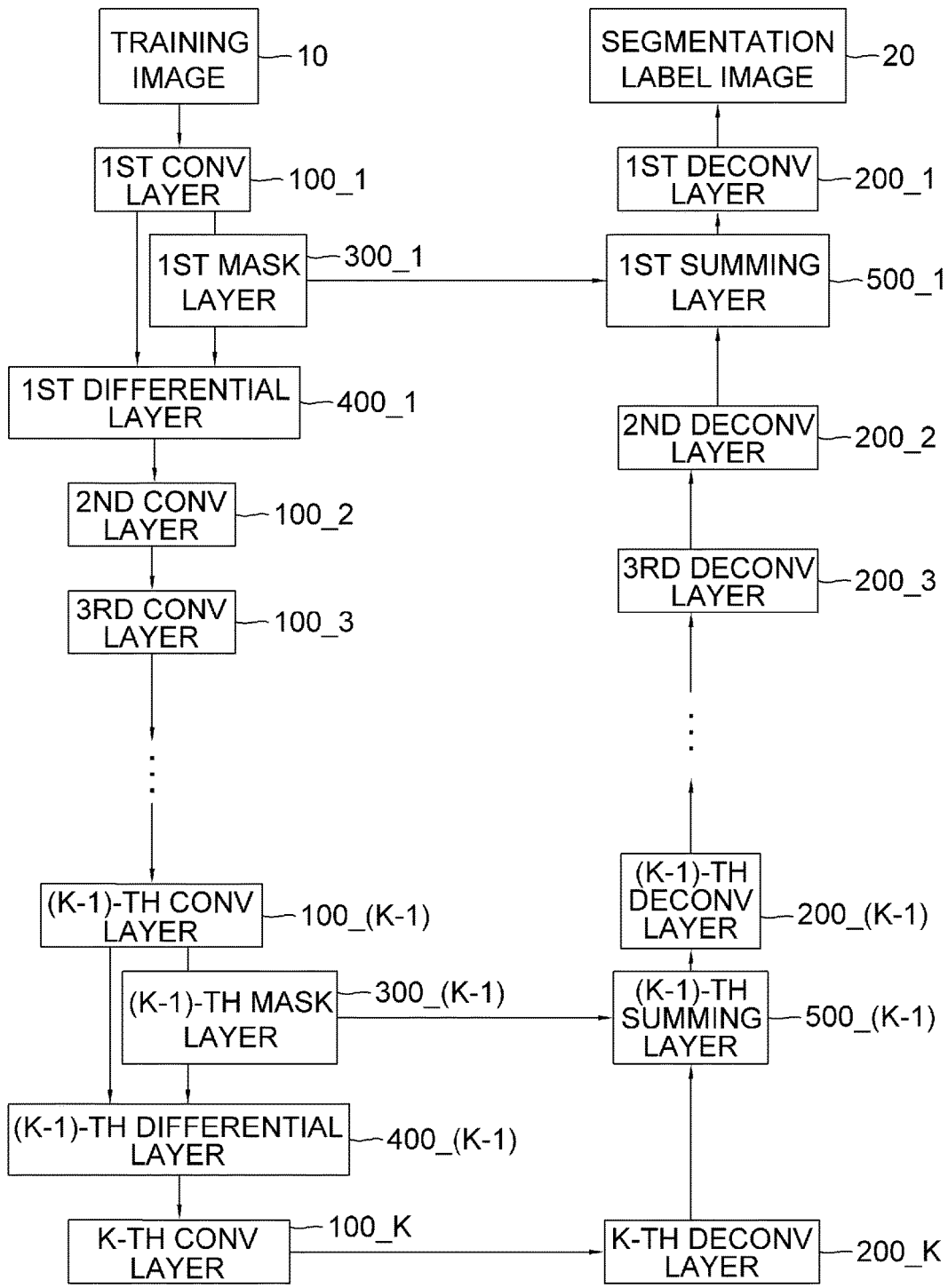
FIG. 3 is a drawing schematically illustrating a process of the image segmentation by using the Laplacian Pyramid network in accordance with another example embodiment of the present disclosure.

FIG. 3 is a drawing schematically illustrating the image segmentation by using the Laplacian Pyramid network in accordance with another example embodiment of the present disclosure.

The learning device based on the CNN for learning the Laplacian Pyramid network illustrated in FIG. 3 in accordance with another example embodiment of the present disclosure may have a basically similar configuration to the learning device based on the CNN for learning the Laplacian Pyramid network illustrated in FIG. 2 in accordance with one example embodiment of the present disclosure, but it may include a first to an h-th mask layers respectively corresponding to h convolutional layers among the first to the (k−1)-th convolutional layers 100_1 to 100_(k−1), and a first to an h-th differential layers respectively corresponding to the first to the h-th mask layers, wherein the mask layers and the differential layers may not correspond to all the convolutional layers. For reference, a layer represented as 300_1 may be the first mask layer, a layer represented as 300_(k−1) may be the h-th mask layer, a layer represented as 400_1 may be the first differential layer, and a layer represented as 400_(k−1) may be the h-th differential layer, in FIG. 3.

In this case, the learning device illustrated in FIG. 3 may instruct the first to the k-th convolutional layers 100_1 to 100_k to generate the first to the k-th encoded feature maps by processes of (1) instructing the first to the h-th mask layers to extract one or more edge parts from h encoded feature maps, to be respectively inputted to the first to the h-th mask layers, among the first to the k-th encoded feature maps by acquiring one or more areas in which frequencies of the h encoded feature maps are larger than the predetermined threshold, to thereby generate a first to an h-th bandpass feature maps, and (2) instructing the first to the h-th differential layers to generate a first to an h-th differential feature maps by calculating each difference between each of the h encoded feature maps, to be respectively inputted to the first to the h-th mask layers, and each of the first to the h-th bandpass feature maps, to thereby forward each of the first to the h-th differential feature maps to their corresponding next convolutional layers.

Also, the learning device illustrated in FIG. 3 may instruct the k-th to the first deconvolutional layers 200_k to 200_1 to sequentially generate the k-th to the first decoded feature maps (i) by using the h-th to the first bandpass feature maps and h decoded feature maps each of which is outputted from each previous deconvolutional layer of each of h deconvolutional layers corresponding to the h-th to the first mask layers and (ii) by using feature maps outputted from each previous layer of each of k-h deconvolutional layers, which do not correspond to the h-th to the first mask layers. For example, the learning device may instruct the k-th to the first deconvolutional layers 200_k to 200_1 to sequentially generate the k-th to the first decoded feature maps (i) by using the h-th to the first bandpass feature maps and h decoded feature maps each of which is outputted from each previous deconvolutional layer of each of h deconvolutional layers corresponding to the h-th to the first mask layers and (ii) by using the k-th encoded feature map and k-h-1 decoded feature maps outputted from each previous layer of each of k-h deconvolutional layers, which do not correspond to the h-th to the first mask layers.

Figure 4:
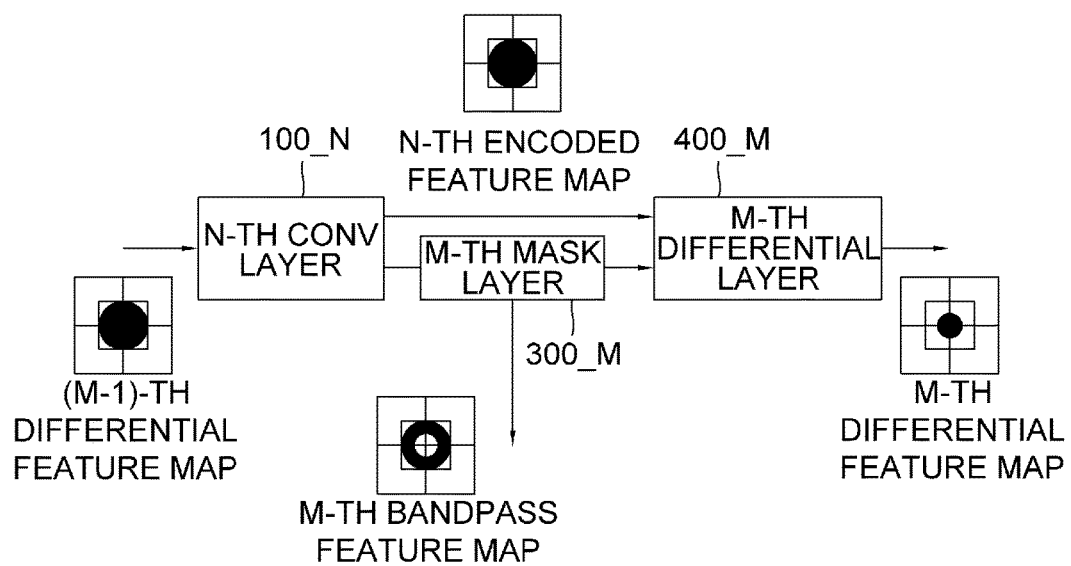
FIG. 4 is a drawing illustrating a detailed process of extracting edge parts by using the Laplacian Pyramid network of the present disclosure.

FIG. 4 represents a detailed process of extracting the edge parts by using the Laplacian Pyramid network of the present disclosure.

By referring to FIG. 4, the learning device may instruct an n-th convolutional layer 100_n among the first to the k-th convolutional layers 100_1 to 100_k to apply one or more convolution operations to an encoded feature map transmitted from its previous convolutional layer, which does not correspond to one of the h mask layers, or a differential feature map transmitted from its previous differential layer, wherein the n is an integer from 1 to the k. Herein, FIG. 4 represents an example of acquiring an (m−1)-th differential feature map from an (m−1)-th differential layer among the first to the h-th differential layers, wherein the m is an integer from 1 to the h.

The n-th convolutional layer 100_n in FIG. 4 may generate an n-th encoded feature map by applying the convolution operations to the (m−1)-th differential feature map inputted thereto. In FIG. 4, each of square boxes represents areas of frequencies of each feature map, and arrows represent inputs or outputs related to the n-th convolutional layer 100_n, an m-th mask layer 300_m, and an m-th differential layer 400_m. As seen in FIG. 4, areas of frequencies of the inputted (m−1)-th differential feature map may not be distinguishable from those of the outputted n-th encoded feature map.

In addition, by referring to FIG. 4, the m-th mask layer 300_m among the first to the h-th mask layers may extract areas, in which variations of frequencies are larger than the predetermined threshold, from the n-th encoded feature map transmitted from the n-th convolutional layer 100_n, to thereby generate an m-th bandpass feature map. The m-th mask layer 300_m may function as a bandpass filter since it generates the m-th bandpass feature map by acquiring the areas where the variations of the frequencies of the n-th encoded feature map are larger than the predetermined threshold. By referring to FIG. 4, areas of frequencies of the m-th bandpass feature map represent the extracted areas of the frequencies of the n-th encoded feature map higher than a predetermined threshold. Further, the learning device may instruct the m-th differential layer 400_m corresponding to the m-th mask layer 300_m (i) to generate an m-th differential feature map by calculating a difference between the n-th encoded feature map and the m-th bandpass feature map and (ii) to forward the m-th differential feature map to an (n+1)-th convolutional layer (not illustrated) following the n-th convolutional layer 100_n. By referring to FIG. 4, areas of frequencies of the m-th differential feature map may include areas where the frequencies of the n-th encoded feature map higher than the predetermined threshold are eliminated.

Thus, each of bandpass feature maps may be sequentially generated through each of mask layers by extracting areas corresponding to a frequency band of the encoded feature maps, and each of low pass filtered feature maps may be sequentially generated through each of differential layers by eliminating frequencies higher than the predetermined threshold. Therefore, the learning device in accordance with the present disclosure may establish the Laplacian Pyramid network.

That is, the learning device using the Laplacian Pyramid network in accordance with the present disclosure may instruct a mask layer to extract edge parts from an encoded feature map outputted from a convolutional layer, to thereby generate a bandpass feature map, and may instruct a differential layer to generate a differential feature map where a high-frequency band is eliminated by using a difference between the encoded feature map and the bandpass feature map, to thereby forward the differential feature map to a following convolutional layer. In this method, the learning device may extract information on the edge parts from each encoded feature map outputted from each convolutional layer. Herein, the information on the edge parts may be reinforced by one or more additional operations and then may be transmitted to the deconvolutional layers. Thus, the deconvolutional layers may perform a reconstruction process more easily by using the information on the edge parts. Through the method suggested in the present disclosure, it may be possible to extract appropriate edge parts since the information on the edge parts is extracted from the encoded feature maps, not from the decoded feature maps.

The reconstruction process using the information on the edge parts may be performed by the k-th to the second deconvolutional layers 200_k to 200_2 and the (k−1)-th to the first summing layers 500_(k−1) to 500_1 illustrated in FIGS. 2 and 3. For example, though not illustrated in FIG. 4, the learning device may perform the reconstruction process sequentially (i) by instructing an m-th summing layer 500_m to generate an element-wise sum of the m-th bandpass feature map outputted from the m-th mask layer 300_m and an (n+1)-th decoded feature map outputted from an (n+1)-th deconvolutional layer and (ii) by instructing an n-th deconvolutional layer to generate an n-th decoded feature map by applying the deconvolution operations to the element-wise sum of the m-th bandpass feature map and the (n+1)-th decoded feature map.

Figure 5:
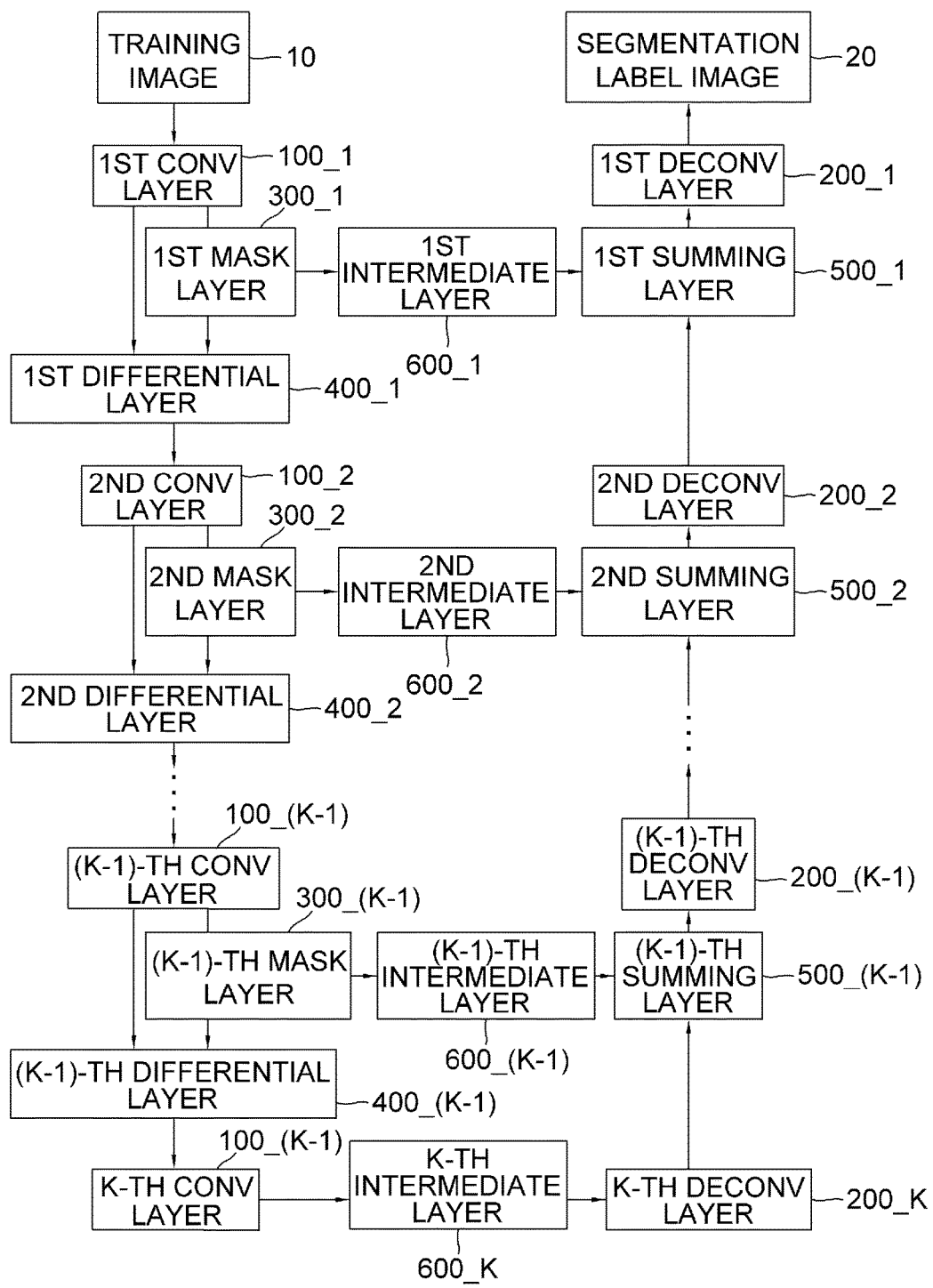
FIG. 5 is a drawing schematically illustrating a process of the image segmentation by using the Laplacian Pyramid network in accordance with still another example embodiment of the present disclosure.

FIG. 5 is a drawing schematically illustrating the image segmentation by using the Laplacian Pyramid network in accordance with still another example embodiment of the present disclosure. The learning device based on the CNN for learning the Laplacian Pyramid network illustrated in FIG. 5 in accordance with still another example of the present disclosure may have a basically similar configuration to the learning device based on the CNN illustrated in FIG. 2 or 3, but may further include intermediate layers between each of the first to the h-th mask layers and its corresponding deconvolutional layer. For example, the intermediate layers may include a first to a k-th intermediate layers 600_1 to 600_k each of which is located between each of the first to the k-th convolutional layers 100_1 to 100_k and each of the first to the k-th deconvolutional layers 200_1 to 200_k, wherein h intermediate layers each of which is located between each of the first to the h-th mask layers and its corresponding deconvolutional layer are included. At least one of the intermediate layers may perform one or more dilated convolution operations. Herein, a receptive field of each of the intermediate layers may be determined according to filter weights having a value of 0.

If the h intermediate layers are further included, the learning device may instruct the h intermediate layers to respectively generate h intermediate feature maps by acquiring each of the first to the h-th bandpass feature maps, outputted from the first to the h-th mask layers. Then, the learning device may instruct the k-th to the first deconvolutional layers to sequentially generate the k-th to the first decoded feature maps (i) by using the h intermediate feature maps and the h decoded feature maps, each of which is outputted from each previous deconvolutional layer of each of the h deconvolutional layers corresponding to the h intermediate layers, and (ii) by using the k-th encoded feature map and k-h-1 decoded feature maps outputted from each previous layer of each of the k-h deconvolutional layers, which do not correspond to the h intermediate layers. Further, the learning device may include an additional (h+1)-th intermediate layer between the k-th convolutional layer and the k-th deconvolutional layer, wherein the additional (h+1)-th intermediate layer may generate an (h+1)-th intermediate feature map by applying intermediate operations to the k-th encoded feature maps and forwards the (h+1)-th intermediate feature map to the k-th deconvolutional layer. Herein, the intermediate operations may be the dilated convolution operations.

For example, the learning device in FIG. 5 may instruct an m-th intermediate layer 600_m (not illustrated) corresponding to the m-th mask layer 300_m to generate an m-th intermediate feature map by referring to the m-th bandpass feature map, and may instruct the n-th deconvolutional layer 200_n (not illustrated) corresponding to the m-th intermediate layer 600_m to apply the deconvolution operations to an element-wise sum of the m-th intermediate feature map and the (n+1)-th decoded feature map outputted from the (n+1)-th deconvolutional layer 200 (n+1) (not illustrated) to thereby generate the n-th decoded feature map.

Also, the learning method illustrated in FIGS. 2 to 5 may be applied to a testing method of the CNN. For reference, in the description below, the phrase "for training" is added for terms related to the learning processes, and the phrase "for testing" is added for terms related to testing processes, to avoid possible confusion.

That is, the testing method for a segmentation of at least one test image may include steps of: (a) on condition that, assuming that the learning device includes (i) the first to the k-th convolutional layers, which respectively generate a first to a k-th encoded feature maps for training by applying the convolution operations to at least one feature map for training corresponding to the training image, (ii) the k-th to the first deconvolutional layers, which respectively generate a k-th to a first decoded feature maps for training by applying the deconvolution operations to the k-th encoded feature map for training, (iii) the first to the h-th mask layers respectively corresponding to the h convolutional layers among the k convolutional layers, and (iv) the first to the h-th differential layers respectively corresponding to the first to the h-th mask layers, wherein the h is an integer from 1 to (k−1), the learning device (1) has instructed the first to the k-th convolutional layers to generate the first to the k-th encoded feature maps for training through processes of (1-1) instructing the first to the h-th mask layers to extract one or more edge parts for training from h encoded feature maps for training, to be respectively inputted to the first to the h-th mask layers, among the first to the k-th encoded feature maps for training by acquiring one or more areas for training in which frequencies of the h encoded feature maps for training are larger than the predetermined threshold, to thereby generate a first to an h-th bandpass feature maps for training, and (1-2) instructing the first to the h-th differential layers to generate a first to an h-th differential feature maps for training by calculating each difference between each of the h encoded feature maps for training, to be respectively inputted to the first to the h-th mask layers, and each of the first to the h-th bandpass feature maps for training, to thereby forward each of the first to the h-th differential feature maps for training to their corresponding next convolutional layers, (2) has instructed the k-th to the first deconvolutional layers to sequentially generate the k-th to the first decoded feature maps for training (2-1) by using the h-th to the first bandpass feature maps for training and h decoded feature maps for training each of which is outputted from each previous deconvolutional layer of each of h deconvolutional layers corresponding to the h-th to the first mask layers and (2-2) by using feature maps for training outputted from each previous layer of each of k-h deconvolutional layers, which do not correspond to the h-th to the first mask layers, and (3) has backpropagated one or more losses generated by referring to the first decoded feature map for training and its corresponding at least one GT label image, to thereby adjust the parameters of at least part of the first to the k-th deconvolutional layers and the k-th to the first convolutional layers; a testing device, if the test image is acquired, instructing the first to the k-th convolutional layers to generate a first to a k-th encoded feature maps for testing through processes of (1) instructing the first to the h-th mask layers to extract one or more edge parts for testing from h encoded feature maps for testing, to be respectively inputted to the first to the h-th mask layers, among the first to the k-th encoded feature maps for testing by acquiring one or more areas for testing in which frequencies of the h encoded feature maps for testing are larger than a predetermined threshold, to thereby generate a first to an h-th bandpass feature maps for testing, and (2) instructing the first to the h-th differential layers to generate a first to an h-th differential feature maps for testing by calculating each difference between each of the h encoded feature maps for testing, to be respectively inputted to the first to the h-th mask layers, and each of the first to the h-th bandpass feature maps for testing, to thereby forward each of the first to the h-th differential feature maps for testing to their corresponding next convolutional layers; and (b) the testing device instructing the k-th to the first deconvolutional layers to sequentially generate the k-th to the first decoded feature maps for testing (i) by using the h-th to the first bandpass feature maps for testing and h decoded feature maps for testing each of which is outputted from each previous deconvolutional layer of each of h deconvolutional layers corresponding to the h-th to the first mask layers and (ii) by using feature maps for testing outputted from each previous layer of each of k-h deconvolutional layers, which do not correspond to the h-th to the first mask layers.

The present disclosure has an effect of providing the CNN capable of generating at least one feature map with preserved information on edge parts.

The present disclosure has another effect of providing the CNN capable of establishing the Laplacian Pyramid network.

The present disclosure has still another effect of reflecting information on the accurate edge parts as the edge parts are extracted from the encoded feature maps, not randomly generated edge parts.

The learning method and the testing method in accordance with the present disclosure may be performed to detect edges of road obstacles and traffic signs, etc. required to satisfy level 4 and level 5 of autonomous vehicles. Further, the traffic signs, as well as landmarks and road markers may be detected more accurately by reinforcing text parts as edge parts in an image.

It would be understood by one of ordinary skill in the art that a transmission and/or a reception of the above-described images such as the training image and the test image can be performed by communication parts of the learning device and the testing device, and processes of the convolution operation, the deconvolution operation, and the loss value operation can be mainly performed by processors of the learning device and the testing device, but the present disclosure is not limited to these examples. In addition, the learning device and the testing device may further include memories capable of storing computer readable instructions for performing the above-described processes. As one example, the processor, the memory, a medium, etc. may be integrated with an integrated processor.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a compiler but also a high level language code that can be executed by a computer using an interpreter, etc. The hardware device can work as more than a software module to perform the process in accordance with the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A learning method for improving a segmentation performance using a learning device, wherein the learning device includes (i) a first to a k-th convolutional layers, which respectively generate a first to a k-th encoded feature maps by applying one or more convolution operations to at least one feature map corresponding to at least one training image, (ii) a k-th to a first deconvolutional layers, which respectively generate a k-th to a first decoded feature maps by applying one or more deconvolution operations to the k-th encoded feature map, (iii) a first to an h-th mask layers respectively corresponding to h convolutional layers among the k convolutional layers, and (iv) a first to an h-th differential layers respectively corresponding to the first to the h-th mask layers, and wherein the h is an integer from 1 to (k−1), comprising steps of:

(a) the learning device, if the training image is acquired, instructing the first to the k-th convolutional layers to generate the first to the k-th encoded feature maps through processes of (1) instructing the first to the h-th mask layers to extract one or more edge parts from h encoded feature maps, to be respectively inputted to the first to the h-th mask layers, among the first to the k-th encoded feature maps by acquiring one or more areas in which frequencies of the h encoded feature maps are larger than a predetermined threshold, to thereby generate a first to an h-th bandpass feature maps, and (2) instructing the first to the h-th differential layers to generate a first to an h-th differential feature maps by calculating each difference between each of the h encoded feature maps, to be respectively inputted to the first to the h-th mask layers, and each of the first to the h-th bandpass feature maps, to thereby forward each of the first to the h-th differential feature maps to their corresponding next convolutional layers;

(b) the learning device instructing the k-th to the first deconvolutional layers to sequentially generate the k-th to the first decoded feature maps (i) by using the h-th to the first bandpass feature maps and h decoded feature maps each of which is outputted from each previous deconvolutional layer of each of h deconvolutional layers corresponding to the h-th to the first mask layers and (ii) by using feature maps outputted from each previous layer of each of k-h deconvolutional layers, which do not correspond to the h-th to the first mask layers; and (c) the learning device backpropagating one or more losses generated by referring to the first decoded feature map and its corresponding at least one GT (ground truth) label image, to thereby adjust one or more parameters of at least part of the first to the k-th deconvolutional layers and the k-th to the first convolutional layers.

2. The learning method of claim 1, wherein, at the process of (1), the learning device instructs at least m-th mask layer among the first to the h-th mask layers to extract areas, in which variations of frequencies are larger than the predetermined threshold, from an n-th encoded feature map transmitted from an n-th convolutional layer corresponding to the m-th mask layer, to thereby generate an m-th bandpass feature map, wherein the m is an integer from 1 to the h, and wherein the n is an integer from 1 to the k, wherein, at the process of (2), the learning device instructs an m-th differential layer corresponding to the m-th mask layer to generate an m-th differential feature map by calculating a difference between the n-th encoded feature map and the m-th bandpass feature map and to forward the m-th differential feature map to an (n+1)-th convolutional layer following the n-th convolutional layer, and wherein, at the step of (b), the learning device instructs an n-th deconvolutional layer corresponding to the m-th mask layer to apply the deconvolution operations to an element-wise sum of the m-th bandpass feature map and an (n+1)-th decoded feature map outputted from an (n+1)-th deconvolutional layer, to thereby generate an n-th decoded feature map.

3. The learning method of claim 1, wherein, at the step of (c), the learning device instructs at least one loss layer corresponding to at least one of the k-th to the first deconvolutional layers to generate the losses by referring to at least one decoded feature map, outputted from said at least one of the k-th to the first deconvolutional layers, and its corresponding at least one GT label image, to thereby backpropagate the losses.

4. The learning method of claim 1, wherein, at the step of (a), the learning device instructs the first to the k-th convolutional layers to respectively generate the first to the k-th encoded feature maps by sequentially decreasing sizes of the training image and the first to the (k−1)-th encoded feature maps and increasing the number of channels of the training image and the first to the (k−1)-th encoded feature maps, and instructs the first to the h-th mask layers to extract the edge parts from the h encoded feature maps, to be respectively inputted to the first to the h-th mask layers, among the first to the k-th encoded feature maps by extracting the areas where variations of the frequencies of the h encoded feature maps are larger than the predetermined threshold, to thereby generate the first to the h-th bandpass feature maps, and wherein, at the step of (b), the learning device instructs the k-th to the first deconvolutional layers to respectively generate the k-th to the first decoded feature maps by sequentially increasing sizes of the k-th encoded feature map and the k-th to the second decoded feature maps and decreasing the number of channels of the k-th encoded feature map and the k-th to the second decoded feature maps.

5. The learning method of claim 1, wherein the learning device further includes (v) a first to an h-th intermediate layers each of which is located between each of the first to the h-th mask layers and its corresponding deconvolutional layer; and wherein the step of (b) includes steps of:

(b1) the learning device instructing the first to the h-th intermediate layers to respectively generate a first to an h-th intermediate feature maps by acquiring each of the first to the h-th bandpass feature maps, outputted from the first to the h-th mask layers; and (b2) the learning device instructing the k deconvolutional layers to sequentially generate the k-th to the first decoded feature maps (i) by using the h-th to the first intermediate feature maps and the h decoded feature maps each of which is outputted from each previous deconvolutional layer of each of the h deconvolutional layers corresponding to the h-th to the first intermediate layers and (ii) by using the k-th encoded feature map and k-h−1 decoded feature maps outputted from each previous layer of each of the k-h deconvolutional layers, which do not correspond to the h-th to the first intermediate layers.

6. The learning method of claim 5, wherein the learning device further includes an additional (h+1)-th intermediate layer between the k-th convolutional layer and the k-th deconvolutional layer, and wherein the additional (h+1)-th intermediate layer generates an (h+1)-th intermediate feature map by applying intermediate operations to the k-th encoded feature maps and forwards the (h+1)-th intermediate feature map to the k-th deconvolutional layer.

7. The learning method of claim 5, wherein at least one of the first to the h-th intermediate layers performs one or more dilated convolution operations, and wherein at least one receptive field of the h intermediate layers is determined according to filter weights having a value of 0.

8. The learning method of claim 7, wherein, at the process of (1), the learning device instructs at least m-th mask layer among the first to the h-th mask layers to extract areas, in which variations of the frequencies are larger than the predetermined threshold, from an n-th encoded feature map transmitted from an n-th convolutional layer corresponding to the m-th mask layer, to thereby generate an m-th bandpass feature map, wherein the m is an integer from 1 to the h, and wherein the n is an integer from 1 to the k, wherein, at the process of (2), the learning device instructs an m-th differential layer corresponding to the m-th mask layer to generate an m-th differential feature map by calculating a difference between the n-th encoded feature map and the m-th bandpass feature map and to forward the m-th differential feature map to an (n+1)-th convolutional layer following the n-th convolutional layer, wherein, at the step of (b1), the learning device instructs an m-th intermediate layer corresponding to the m-th mask layer to generate an m-th intermediate feature map by referring to the m-th bandpass feature map, and wherein, at the step of (b2), the learning device instructs an n-th deconvolutional layer corresponding to the m-th intermediate layer to apply the deconvolution operations to an element-wise sum of the m-th intermediate feature map and an (n+1)-th decoded feature map outputted from an (n+1)-th deconvolutional layer, to thereby generate an n-th decoded feature map.

9. A testing method for a segmentation of at least one test image, comprising steps of:

(a) on condition that, assuming that a learning device includes (i) a first to a k-th convolutional layers, which respectively generate a first to a k-th encoded feature maps for training by applying one or more convolution operations to at least one feature map for training corresponding to at least one training image, (ii) a k-th to a first deconvolutional layers, which respectively generate a k-th to a first decoded feature maps for training by applying one or more deconvolution operations to the k-th encoded feature map for training, (iii) a first to an h-th mask layers respectively corresponding to h convolutional layers among the k convolutional layers, and (iv) a first to an h-th differential layers respectively corresponding to the first to the h-th mask layers, wherein the h is an integer from 1 to (k−1), the learning device (1) has instructed the first to the k-th convolutional layers to generate the first to the k-th encoded feature maps for training through processes of (1-1) instructing the first to the h-th mask layers to extract one or more edge parts for training from h encoded feature maps for training, to be respectively inputted to the first to the h-th mask layers, among the first to the k-th encoded feature maps for training by acquiring one or more areas for training in which frequencies of the h encoded feature maps for training are larger than a predetermined threshold, to thereby generate a first to an h-th bandpass feature maps for training, and (1-2) instructing the first to the h-th differential layers to generate a first to an h-th differential feature maps for training by calculating each difference between each of the h encoded feature maps for training, to be respectively inputted to the first to the h-th mask layers, and each of the first to the h-th bandpass feature maps for training, to thereby forward each of the first to the h-th differential feature maps for training to their corresponding next convolutional layers, (2) has instructed the k-th to the first deconvolutional layers to sequentially generate the k-th to the first decoded feature maps for training (2-1) by using the h-th to the first bandpass feature maps for training and h decoded feature maps for training each of which is outputted from each previous deconvolutional layer of each of h deconvolutional layers corresponding to the h-th to the first mask layers and (2-2) by using feature maps for training outputted from each previous layer of each of k-h deconvolutional layers, which do not correspond to the h-th to the first mask layers, and (3) has backpropagated one or more losses generated by referring to the first decoded feature map for training and its corresponding at least one GT (ground truth) label image, to thereby adjust one or more parameters of at least part of the first to the k-th deconvolutional layers and the k-th to the first convolutional layers; a testing device, if the test image is acquired, instructing the first to the k-th convolutional layers to generate a first to a k-th encoded feature maps for testing through processes of (a1) instructing the first to the h-th mask layers to extract one or more edge parts for testing from h encoded feature maps for testing, to be respectively inputted to the first to the h-th mask layers, among the first to the k-th encoded feature maps for testing by acquiring one or more areas for testing in which frequencies of the h encoded feature maps for testing are larger than a predetermined threshold, to thereby generate a first to an h-th bandpass feature maps for testing, and (a2) instructing the first to the h-th differential layers to generate a first to an h-th differential feature maps for testing by calculating each difference between each of the h encoded feature maps for testing, to be respectively inputted to the first to the h-th mask layers, and each of the first to the h-th bandpass feature maps for testing, to thereby forward each of the first to the h-th differential feature maps for testing to their corresponding next convolutional layers; and (b) the testing device instructing the k-th to the first deconvolutional layers to sequentially generate the k-th to the first decoded feature maps for testing (i) by using the h-th to the first bandpass feature maps for testing and h decoded feature maps for testing each of which is outputted from each previous deconvolutional layer of each of h deconvolutional layers corresponding to the h-th to the first mask layers and (ii) by using feature maps for testing outputted from each previous layer of each of k-h deconvolutional layers, which do not correspond to the h-th to the first mask layers.

10. The testing method of claim 9, wherein, at the process of (a1), the testing device instructs at least m-th mask layer among the first to the h-th mask layers to extract areas, in which variations of frequencies are larger than the predetermined threshold, from an n-th encoded feature map for testing transmitted from an n-th convolutional layer corresponding to the m-th mask layer, to thereby generate an m-th bandpass feature map for testing, wherein the m is an integer from 1 to the h, and wherein the n is an integer from 1 to the k, wherein, at the process of (a2), the testing device instructs an m-th differential layer corresponding to the m-th mask layer to generate an m-th differential feature map for testing by calculating a difference between the n-th encoded feature map for testing and the m-th bandpass feature map for testing and to forward the m-th differential feature map for testing to an (n+1)-th convolutional layer following the n-th convolutional layer, and wherein, at the step of (b), the testing device instructs an n-th deconvolutional layer corresponding to the m-th mask layer to apply the deconvolution operations to an element-wise sum for testing of the m-th bandpass feature map for testing and an (n+1)-th decoded feature map for testing outputted from an (n+1)-th deconvolutional layer, to thereby generate an n-th decoded feature map for testing.

11. The testing method of claim 9, wherein, at the step of (a), the testing device instructs the first to the k-th convolutional layers to respectively generate the first to the k-th encoded feature maps for testing by sequentially decreasing sizes of the test image and the first to the (k−1)-th encoded feature maps for testing and increasing the number of channels of the test image and the first to the (k−1)-th encoded feature maps for testing, and instructs the first to the h-th mask layers to extract the edge parts for testing from the h encoded feature maps for testing, to be respectively inputted to the first to the h-th mask layers, among the first to the k-th encoded feature maps for testing by extracting the areas where variations of the frequencies of the h encoded feature maps for testing are larger than the predetermined threshold, to thereby generate the first to the h-th bandpass feature maps for testing, and wherein, at the step of (b), the testing device instructs the k-th to the first deconvolutional layers to respectively generate the k-th to the first decoded feature maps for testing by sequentially increasing sizes of the k-th encoded feature map for testing and the k-th to the second decoded feature maps for testing and decreasing the number of channels of the k-th encoded feature map for testing and the k-th to the second decoded feature maps for testing.

12. The testing method of claim 9, wherein the testing device further includes (v) a first to an h-th intermediate layers each of which is located between each of the first to the h-th mask layers and its corresponding deconvolutional layer; and wherein the step of (b) includes steps of:
(b1) the testing device instructing the first to the h-th intermediate layers to respectively generate a first to an h-th intermediate feature maps for testing by acquiring each of the first to the h-th bandpass feature maps for testing, outputted from the first to the h-th mask layers; and
(b2) the testing device instructing the k deconvolutional layers to sequentially generate the k-th to the first decoded feature maps for testing (i) by using the h-th to the first intermediate feature maps for testing and the h decoded feature maps for testing each of which is outputted from each previous deconvolutional layer of each of the h deconvolutional layers corresponding to the h-th to the first intermediate layers and (ii) by using the k-th encoded feature map for testing and k-h-1 decoded feature maps for testing outputted from each previous layer of each of the k-h deconvolutional layers, which do not correspond to the h-th to the first intermediate layers.

13. The testing method of claim 12, wherein the testing device further includes an additional (h+1)-th intermediate layer between the k-th convolutional layer and the k-th deconvolutional layer, and wherein the additional (h+1)-th intermediate layer generates an (h+1)-th intermediate feature map for testing by applying intermediate operations to the k-th encoded feature maps for testing and forwards the (h+1)-th intermediate feature map for testing to the k-th deconvolutional layer.

14. The testing method of claim 12, wherein at least one of the first to the h-th intermediate layers performs one or more dilated convolution operations, and wherein at least one receptive field of the h intermediate layers is determined according to filter weights having a value of 0.

15. The testing method of claim 14, wherein, at the process of (a1), the testing device instructs at least m-th mask layer among the first to the h-th mask layers to extract areas, in which variations of the frequencies are larger than the predetermined threshold, from an n-th encoded feature map for testing transmitted from an n-th convolutional layer corresponding to the m-th mask layer, to thereby generate an m-th bandpass feature map for testing, wherein the m is an integer from 1 to the h, and wherein the n is an integer from 1 to the k, wherein, at the process of (a2), the testing device instructs an m-th differential layer corresponding to the m-th mask layer to generate an m-th differential feature map for testing by calculating a difference between the n-th encoded feature map for testing and the m-th bandpass feature map for testing and to forward the m-th differential feature map for testing to an (n+1)-th convolutional layer following the n-th convolutional layer, wherein, at the step of (b1), the testing device instructs an m-th intermediate layer corresponding to the m-th mask layer to generate an m-th intermediate feature map for testing by referring to the m-th bandpass feature map for testing, and wherein, at the step of (b2), the testing device instructs an n-th deconvolutional layer corresponding to the m-th intermediate layer to apply the deconvolution operations to an element-wise sum for testing of the m-th intermediate feature map for testing and an (n+1)-th decoded feature map for testing outputted from an (n+1)-th deconvolutional layer, to thereby generate an n-th decoded feature map for testing.

16. A learning device for improving a segmentation performance in which (i) a first to a k-th convolutional layers, which respectively generate a first to a k-th encoded feature maps by applying one or more convolution operations to at least one feature map corresponding to at least one training image, (ii) a k-th to a first deconvolutional layers, which respectively generate a k-th to a first decoded feature maps by applying one or more deconvolution operations to the k-th encoded feature map, (iii) a first to an h-th mask layers respectively corresponding to h convolutional layers among the k convolutional layers, and (iv) a first to an h-th differential layers respectively corresponding to the first to the h-th mask layers, wherein the h is an integer from 1 to (k−1) are included, comprising:

at least one memory that stores instructions; and
at least one processor configured to execute the instructions to: perform processes of (I) instructing the first to the k-th convolutional layers to generate the first to the k-th encoded feature maps through processes of (I-1) instructing the first to the h-th mask layers to extract one or more edge parts from h encoded feature maps, to be respectively inputted to the first to the h-th mask layers, among the first to the k-th encoded feature maps by acquiring one or more areas in which frequencies of the h encoded feature maps are larger than a predetermined threshold, to thereby generate a first to an h-th bandpass feature maps, and (I-2) instructing the first to the h-th differential layers to generate a first to an h-th differential feature maps by calculating each difference between each of the h encoded feature maps, to be respectively inputted to the first to the h-th mask layers, and each of the first to the h-th bandpass feature maps, to thereby forward each of the first to the h-th differential feature maps to their corresponding next convolutional layers, (II) instructing the k-th to the first deconvolutional layers to sequentially generate the k-th to the first decoded feature maps (i) by using the h-th to the first bandpass feature maps and h decoded feature maps each of which is outputted from each previous deconvolutional layer of each of h deconvolutional layers corresponding to the h-th to the first mask layers and (ii) by using feature maps outputted from each previous layer of each of k-h deconvolutional layers, which do not correspond to the h-th to the first mask layers, and (III) backpropagating one or more losses generated by referring to the first decoded feature map and its corresponding at least one GT (ground truth) label image, to thereby adjust one or more parameters of at least part of the first to the k-th deconvolutional layers and the k-th to the first convolutional layers.

17. The learning device of claim 16, wherein, at the process of (I-1), the processor instructs at least m-th mask layer among the first to the h-th mask layers to extract areas, in which variations of frequencies are larger than the predetermined threshold, from an n-th encoded feature map transmitted from an n-th convolutional layer corresponding to the m-th mask layer, to thereby generate an m-th bandpass feature map, wherein the m is an integer from 1 to the h, and wherein the n is an integer from 1 to the k,
wherein, at the process of (I-2), the processor instructs an m-th differential layer corresponding to the m-th mask layer to generate an m-th differential feature map by calculating a difference between the n-th encoded feature map and the m-th bandpass feature map and to forward the m-th differential feature map to an (n+1)-th convolutional layer following the n-th convolutional layer, and
wherein, at the process of (II), the processor instructs an n-th deconvolutional layer corresponding to the m-th mask layer to apply the deconvolution operations to an element-wise sum of the m-th bandpass feature map and an (n+1)-th decoded feature map outputted from an (n+1)-th deconvolutional layer, to thereby generate an n-th decoded feature map.

18. The learning device of claim 16, wherein, at the process of (III), the processor instructs at least one loss layer corresponding to at least one of the k-th to the first deconvolutional layers to generate the losses by referring to at least one decoded feature map, outputted from said at least one of the k-th to the first deconvolutional layers, and its corresponding at least one GT label image, to thereby backpropagate the losses.

19. The learning device of claim 16, wherein, at the process of (I), the processor instructs the first to the k-th convolutional layers to respectively generate the first to the k-th encoded feature maps by sequentially decreasing sizes of the training image and the first to the (k−1)-th encoded feature maps and increasing the number of channels of the training image and the first to the (k−1)-th encoded feature maps, and instructs the first to the h-th mask layers to extract the edge parts from the h encoded feature maps, to be respectively inputted to the first to the h-th mask layers, among the first to the k-th encoded feature maps by extracting the areas where variations of the frequencies of the h encoded feature maps are larger than the predetermined threshold, to thereby generate the first to the h-th bandpass feature maps, and
wherein, at the process of (II), the processor instructs the k-th to the first deconvolutional layers to respectively generate the k-th to the first decoded feature maps by sequentially increasing sizes of the k-th encoded feature map and the k-th to the second decoded feature maps and decreasing the number of channels of the k-th encoded feature map and the k-th to the second decoded feature maps.

20. The learning device of claim 16, wherein (v) a first to an h-th intermediate layers each of which is located between each of the first to the h-th mask layers and its corresponding deconvolutional layer are further included in the learning device; and
wherein the process of (II) includes processes of:
(II-1) the processor instructing the first to the h-th intermediate layers to respectively generate a first to an h-th intermediate feature maps by acquiring each of the first to the h-th bandpass feature maps, outputted from the first to the h-th mask layers; and
(II-2) the processor instructing the k deconvolutional layers to sequentially generate the k-th to the first decoded feature maps (i) by using the h-th to the first intermediate feature maps and the h decoded feature maps each of which is outputted from each previous deconvolutional layer of each of the h deconvolutional layers corresponding to the h-th to the first intermediate layers and (ii) by using the k-th encoded feature map and k-h-1 decoded feature maps outputted from each previous layer of each of the k-h deconvolutional layers, which do not correspond to the h-th to the first intermediate layers.

21. The learning device of claim 20, wherein an additional (h+1)-th intermediate layer between the k-th convolutional layer and the k-th deconvolutional layer, and wherein the additional (h+1)-th intermediate layer generates an (h+1)-th intermediate feature map by applying intermediate operations to the k-th encoded feature maps and forwards the (h+1)-th intermediate feature map to the k-th deconvolutional layer are further included in the learning device.

22. The learning device of claim 20, wherein at least one of the first to the h-th intermediate layers performs one or more dilated convolution operations, and wherein at least one receptive field of the h intermediate layers is determined according to filter weights having a value of 0.

23. The learning device of claim 22, wherein, at the process of (I-1), the processor instructs at least m-th mask layer among the first to the h-th mask layers to extract areas, in which variations of the frequencies are larger than the predetermined threshold, from an n-th encoded feature map transmitted from an n-th convolutional layer corresponding to the m-th mask layer, to thereby generate an m-th bandpass feature map, wherein the m is an integer from 1 to the h, and wherein the n is an integer from 1 to the k,
wherein, at the process of (I-2), the processor instructs an m-th differential layer corresponding to the m-th mask layer to generate an m-th differential feature map by calculating a difference between the n-th encoded feature map and the m-th bandpass feature map and to forward the m-th differential feature map to an (n+1)-th convolutional layer following the n-th convolutional layer,
wherein, at the process of (II-1), the processor instructs an m-th intermediate layer corresponding to the m-th mask layer to generate an m-th intermediate feature map by referring to the m-th bandpass feature map, and wherein, at the process of (II-2), the processor instructs an n-th deconvolutional layer corresponding to the m-th intermediate layer to apply the deconvolution operations to an element-wise sum of the m-th intermediate feature map and an (n+1)-th decoded feature map outputted from an (n+1)-th deconvolutional layer, to thereby generate an n-th decoded feature map.

24. A testing device for a segmentation of at least one test image, comprising:

at least one memory that stores instructions; and at least one processor, on condition that, assuming that a learning device includes (i) a first to a k-th convolutional layers, which respectively generate a first to a k-th encoded feature maps for training by applying one or more convolution operations to at least one feature map for training corresponding to at least one training image, (ii) a k-th to a first deconvolutional layers, which respectively generate a k-th to a first decoded feature maps for training by applying one or more deconvolution operations to the k-th encoded feature map for training, (iii) a first to an h-th mask layers respectively corresponding to h convolutional layers among the k convolutional layers, and (iv) a first to an h-th differential layers respectively corresponding to the first to the h-th mask layers, wherein the h is an integer from 1 to (k−1), the learning device (1) has instructed the first to the k-th convolutional layers to generate the first to the k-th encoded feature maps for training through processes of (1-1) instructing the first to the h-th mask layers to extract one or more edge parts for training from h encoded feature maps for training, to be respectively inputted to the first to the h-th mask layers, among the first to the k-th encoded feature maps for training by acquiring one or more areas for training in which frequencies of the h encoded feature maps for training are larger than a predetermined threshold, to thereby generate a first to an h-th bandpass feature maps for training, and (1-2) instructing the first to the h-th differential layers to generate a first to an h-th differential feature maps for training by calculating each difference between each of the h encoded feature maps for training, to be respectively inputted to the first to the h-th mask layers, and each of the first to the h-th bandpass feature maps for training, to thereby forward each of the first to the h-th differential feature maps for training to their corresponding next convolutional layers, (2) has instructed the k-th to the first deconvolutional layers to sequentially generate the k-th to the first decoded feature maps for training (2-1) by using the h-th to the first bandpass feature maps for training and h decoded feature maps for training each of which is outputted from each previous deconvolutional layer of each of h deconvolutional layers corresponding to the h-th to the first mask layers and (2-2) by using feature maps for training outputted from each previous layer of each of k-h deconvolutional layers, which do not correspond to the h-th to the first mask layers, and (3) has backpropagated one or more losses generated by referring to the first decoded feature map for training and its corresponding at least one GT (ground truth) label image, to thereby adjust one or more parameters of at least part of the first to the k-th deconvolutional layers and the k-th to the first convolutional layers; configured to execute the instructions to: perform processes of (I) instructing the first to the k-th convolutional layers to generate a first to a k-th encoded feature maps for testing through processes of (I-1) instructing the first to the h-th mask layers to extract one or more edge parts for testing from h encoded feature maps for testing, to be respectively inputted to the first to the h-th mask layers, among the first to the k-th encoded feature maps for testing by acquiring one or more areas for testing in which frequencies of the h encoded feature maps for testing are larger than a predetermined threshold, to thereby generate a first to an h-th bandpass feature maps for testing, and (I-2) instructing the first to the h-th differential layers to generate a first to an h-th differential feature maps for testing by calculating each difference between each of the h encoded feature maps for testing, to be respectively inputted to the first to the h-th mask layers, and each of the first to the h-th bandpass feature maps for testing, to thereby forward each of the first to the h-th differential feature maps for testing to their corresponding next convolutional layers, and (II) instructing the k-th to the first deconvolutional layers to sequentially generate the k-th to the first decoded feature maps for testing (i) by using the h-th to the first bandpass feature maps for testing and h decoded feature maps for testing each of which is outputted from each previous deconvolutional layer of each of h deconvolutional layers corresponding to the h-th to the first mask layers and (ii) by using feature maps for testing outputted from each previous layer of each of k-h deconvolutional layers, which do not correspond to the h-th to the first mask layers.

25. The testing device of claim 24, wherein, at the process of (I-1), the processor instructs at least m-th mask layer among the first to the h-th mask layers to extract areas, in which variations of frequencies are larger than the predetermined threshold, from an n-th encoded feature map for testing transmitted from an n-th convolutional layer corresponding to the m-th mask layer, to thereby generate an m-th bandpass feature map for testing, wherein the m is an integer from 1 to the h, and wherein the n is an integer from 1 to the k, wherein, at the process of (I-2), the processor instructs an m-th differential layer corresponding to the m-th mask layer to generate an m-th differential feature map for testing by calculating a difference between the n-th encoded feature map for testing and the m-th bandpass feature map for testing and to forward the m-th differential feature map for testing to an (n+1)-th convolutional layer following the n-th convolutional layer, and wherein, at the process of (II), the processor instructs an n-th deconvolutional layer corresponding to the m-th mask layer to apply the deconvolution operations to an element-wise sum for testing of the m-th bandpass feature map for testing and an (n+1)-th decoded feature map for testing outputted from an (n+1)-th deconvolutional layer, to thereby generate an n-th decoded feature map for testing.

26. The testing device of claim 24, wherein, at the process of (I), the processor instructs the first to the k-th convolutional layers to respectively generate the first to the k-th encoded feature maps for testing by sequentially decreasing sizes of the test image and the first to the (k−1)-th encoded feature maps for testing and increasing the number of channels of the test image and the first to the (k−1)-th encoded feature maps for testing, and instructs the first to the h-th mask layers to extract the edge parts for testing from the h encoded feature maps for testing, to be respectively inputted to the first to the h-th mask layers, among the first to the k-th encoded feature maps for testing by extracting the areas where variations of the frequencies of the h encoded feature maps for testing are larger than the predetermined threshold, to thereby generate the first to the h-th bandpass feature maps for testing, and wherein, at the process of (II), the processor instructs the k-th to the first deconvolutional layers to respectively generate the k-th to the first decoded feature maps for testing by sequentially increasing sizes of the k-th encoded feature map for testing and the k-th to the second decoded feature maps for testing and decreasing the number of channels of the k-th encoded feature map for testing and the k-th to the second decoded feature maps for testing.

27. The testing device of claim 24, wherein (v) a first to an h-th intermediate layers each of which is located between each of the first to the h-th mask layers and its corresponding deconvolutional layer are further included in the testing device; and wherein the process of (II) includes processes of:
    (II-1) the processor instructing the first to the h-th intermediate layers to respectively generate a first to an h-th intermediate feature maps for testing by acquiring each of the first to the h-th bandpass feature maps for testing, outputted from the first to the h-th mask layers; and
    (II-2) the processor instructing the k deconvolutional layers to sequentially generate the k-th to the first decoded feature maps for testing (i) by using the h-th to the first intermediate feature maps for testing and the h decoded feature maps for testing each of which is outputted from each previous deconvolutional layer of each of the h deconvolutional layers corresponding to the h-th to the first intermediate layers and (ii) by using the k-th encoded feature map for testing and k-h-1 decoded feature maps for testing outputted from each previous layer of each of the k-h deconvolutional layers, which do not correspond to the h-th to the first intermediate layers.

28. The testing device of claim 27, wherein an additional (h+1)-th intermediate layer between the k-th convolutional layer and the k-th deconvolutional layer, and wherein the additional (h+1)-th intermediate layer generates an (h+1)-th intermediate feature map for testing by applying intermediate operations to the k-th encoded feature maps for testing and forwards the (h+1)-th intermediate feature map for testing to the k-th deconvolutional layer are further included in the testing device.

29. The testing device of claim 27, wherein at least one of the first to the h-th intermediate layers performs one or more dilated convolution operations, and wherein at least one receptive field of the h intermediate layers is determined according to filter weights having a value of 0.

30. The testing device of claim 29, wherein, at the process of (I-1), the processor instructs at least m-th mask layer among the first to the h-th mask layers to extract areas, in which variations of the frequencies are larger than the predetermined threshold, from an n-th encoded feature map for testing transmitted from an n-th convolutional layer corresponding to the m-th mask layer, to thereby generate an m-th bandpass feature map for testing, wherein the m is an integer from 1 to the h, and wherein the n is an integer from 1 to the k, wherein, at the process of (I-2), the processor instructs an m-th differential layer corresponding to the m-th mask layer to generate an m-th differential feature map for testing by calculating a difference between the n-th encoded feature map for testing and the m-th bandpass feature map for testing and to forward the m-th differential feature map for testing to an (n+1)-th convolutional layer following the n-th convolutional layer, wherein, at the process of (II-1), the processor instructs an m-th intermediate layer corresponding to the m-th mask layer to generate an m-th intermediate feature map for testing by referring to the m-th bandpass feature map for testing, and wherein, at the process of (II-2), the processor instructs an n-th deconvolutional layer corresponding to the m-th intermediate layer to apply the deconvolution operations to an element-wise sum for testing of the m-th intermediate feature map for testing and an (n+1)-th decoded feature map for testing outputted from an (n+1)-th deconvolutional layer, to thereby generate an n-th decoded feature map for testing.

* * * * *